United States Patent
Bordes et al.

(10) Patent No.: US 10,073,171 B2
(45) Date of Patent: Sep. 11, 2018

(54) ON-DEMAND MULTI-SCAN MICRO DOPPLER FOR VEHICLE

(71) Applicant: UHNDER, INC., Austin, TX (US)

(72) Inventors: Jean P. Bordes, St. Charles, MO (US); Raghunath K. Rao, Austin, TX (US); Monier Maher, St. Louis, MO (US)

(73) Assignee: Uhnder, Inc., Austin, TX (US)

(*) Notice: Subject to any disclaimer, the term of this patent is extended or adjusted under 35 U.S.C. 154(b) by 0 days.

(21) Appl. No.: 15/690,898

(22) Filed: Aug. 30, 2017

(65) Prior Publication Data
US 2017/0363731 A1 Dec. 21, 2017

Related U.S. Application Data

(60) Division of application No. 15/463,298, filed on Mar. 20, 2017, now Pat. No. 9,753,132, which is a
(Continued)

(51) Int. Cl.
*G01S 13/50* (2006.01)
*G01S 13/18* (2006.01)
(Continued)

(52) U.S. Cl.
CPC .............. *G01S 13/50* (2013.01); *G01S 7/354* (2013.01); *G01S 13/18* (2013.01); *G01S 13/325* (2013.01);
(Continued)

(58) Field of Classification Search
CPC ........ G01S 13/931; G01S 13/18; G01S 13/50; G01S 7/352; G01S 13/32;
(Continued)

(56) References Cited

U.S. PATENT DOCUMENTS 1,882,128 A   10/1932  Fearing
3,374,478 A    3/1968  Blau
(Continued)

FOREIGN PATENT DOCUMENTS

EP   0725480   11/2011
EP   2821808    7/2015
(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.linl.gov/pdf/711892.pdf.
(Continued)

*Primary Examiner* — Matthew M Barker
(74) *Attorney, Agent, or Firm* — Gardner, Linn, Burkhart & Ondersma, LLP

(57) ABSTRACT

A radar sensing system for a vehicle includes a transmitter, a receiver, a memory, and a processor. The transmitter transmits a radio signal and the receiver receives a reflected radio signal. The processor samples reflected radio signals during a plurality of time slices. The processor produces samples by correlating reflected radio signals to time-delayed replicas of transmitted radio signals. The processor accumulates the time slices into a first radar data cube (RDC) and selectively processes a portion of the first RDC to produce a first partial Doppler output. The processor produces samples during a second scan and accumulates time slices into a second RDC, and then selectively processes a portion of the second RDC to produce a second partial Doppler output. The processor numerically accumulates the first and second partial Doppler outputs to create a
(Continued)

full Doppler output and stores the full Doppler output in memory.

30 Claims, 15 Drawing Sheets

Related U.S. Application Data continuation of application No. 15/204,002, filed on Jul. 7, 2016, now Pat. No. 9,599,702.

(60) Provisional application No. 62/336,966, filed on May 16, 2016, provisional application No. 62/332,544, filed on May 6, 2016, provisional application No. 62/327,004, filed on Apr. 25, 2016.

(51) Int. Cl.
| | |
|---|---|
| G01S 7/35 | (2006.01) |
| G01S 13/32 | (2006.01) |
| G01S 13/36 | (2006.01) |
| G01S 13/93 | (2006.01) |

(52) U.S. Cl.
CPC .......... *G01S 13/36* (2013.01); *G01S 13/931* (2013.01); *G01S 2007/356* (2013.01); *G01S 2013/9375* (2013.01); *G01S 2013/9378* (2013.01); *G01S 2013/9385* (2013.01); *G01S 2013/9392* (2013.01)

(58) Field of Classification Search
CPC ..... G01S 2013/9392; G01S 2013/9385; G01S 2013/9378; G01S 2013/9375; G01S 13/66–13/726
See application file for complete search history.

(56) References Cited

U.S. PATENT DOCUMENTS

| | | | |
|---|---|---|---|
| 3,735,398 | A | 5/1973 | Ross |
| 3,750,169 | A | 7/1973 | Strenglein |
| 3,896,434 | A | 7/1975 | Sirven |
| 4,176,351 | A | 11/1979 | De Vita et al. |
| 4,939,685 | A | 7/1990 | Feintuch |
| 5,034,906 | A | 7/1991 | Chang |
| 5,087,918 | A | 2/1992 | May et al. |
| 5,151,702 | A | 9/1992 | Urkowitz |
| 5,175,710 | A | 12/1992 | Hutson |
| 5,218,619 | A | 6/1993 | Dent |
| 5,280,288 | A | 1/1994 | Sherry et al. |
| 5,341,141 | A | 8/1994 | Frazier et al. |
| 5,345,470 | A | 9/1994 | Alexander |
| 5,657,023 | A | 8/1997 | Lewis et al. |
| 5,724,041 | A | 3/1998 | Inoue et al. |
| 5,892,477 | A | 4/1999 | Wehling |
| 5,917,430 | A | 6/1999 | Greneker, III et al. |
| 5,920,285 | A | 7/1999 | Benjamin |
| 5,931,893 | A | 8/1999 | Dent et al. |
| 5,959,571 | A | 9/1999 | Aoyagi et al. |
| 6,067,314 | A | 5/2000 | Azuma |
| 6,069,581 | A | 5/2000 | Bell et al. |
| 6,121,872 | A | 9/2000 | Weishaupt |
| 6,121,918 | A | 9/2000 | Tullsson |
| 6,184,829 | B1 | 2/2001 | Stilp |
| 6,191,726 | B1 | 2/2001 | Tullsson |
| 6,288,672 | B1 | 9/2001 | Asano et al. |
| 6,347,264 | B2 | 2/2002 | Nicosia et al. |
| 6,400,308 | B1 | 6/2002 | Bell et al. |
| 6,411,250 | B1 | 6/2002 | Oswald et al. |
| 6,417,796 | B1 | 7/2002 | Bowlds |
| 6,583,753 | B1 | 6/2003 | Reed |
| 6,614,387 | B1 | 9/2003 | Deadman |
| 6,624,784 | B1 | 9/2003 | Yamaguchi |
| 6,674,908 | B1 | 1/2004 | Aronov |
| 6,714,956 | B1 | 3/2004 | Liu et al. |
| 6,747,595 | B2 | 6/2004 | Hirabe |
| 6,768,391 | B1 | 7/2004 | Dent et al. |
| 7,119,739 | B1 | 10/2006 | Struckman |
| 7,289,058 | B2 | 10/2007 | Shima |
| 7,299,251 | B2 | 11/2007 | Skidmore et al. |
| 7,338,450 | B2 | 3/2008 | Kristofferson et al. |
| 7,460,055 | B2 | 12/2008 | Nishijima et al. |
| 7,545,310 | B2 | 6/2009 | Matsuoka |
| 7,545,321 | B2 | 6/2009 | Kawasaki |
| 7,564,400 | B2 | 7/2009 | Fukuda |
| 7,609,198 | B2 | 10/2009 | Chang |
| 7,642,952 | B2 | 1/2010 | Fukuda |
| 7,663,533 | B2 | 2/2010 | Toennesen |
| 7,728,762 | B2 | 6/2010 | Sakamoto |
| 7,791,528 | B2 | 9/2010 | Klotzbuecher |
| 7,847,731 | B2 | 12/2010 | Wiesbeck et al. |
| 7,855,677 | B2 | 12/2010 | Negoro et al. |
| 7,859,450 | B2 | 12/2010 | Shirakawa et al. |
| 8,019,352 | B2 | 9/2011 | Rappaport et al. |
| 8,049,663 | B2 | 11/2011 | Frank et al. |
| 8,102,306 | B2 | 1/2012 | Smith, Jr. et al. |
| 8,154,436 | B2 | 4/2012 | Szajnowski |
| 8,330,650 | B2 | 12/2012 | Goldman |
| 8,390,507 | B2 | 3/2013 | Wintermantel |
| 8,532,159 | B2 | 9/2013 | Kagawa et al. |
| 8,547,988 | B2 | 10/2013 | Hadani et al. |
| 8,686,894 | B2 | 4/2014 | Fukuda et al. |
| 8,694,306 | B1 | 4/2014 | Short et al. |
| 9,121,943 | B2 | 9/2015 | Stirlin-Gallacher et al. |
| 9,239,378 | B2 | 1/2016 | Kishigami et al. |
| 9,239,379 | B2 | 1/2016 | Burgio et al. |
| 9,282,945 | B2 | 3/2016 | Smith et al. |
| 9,335,402 | B2 | 5/2016 | Maeno et al. |
| 9,541,639 | B2 | 1/2017 | Searcy et al. |
| 9,568,600 | B2 | 2/2017 | Alland |
| 9,575,160 | B1 | 2/2017 | Davis et al. |
| 9,599,702 | B1 | 3/2017 | Bordes et al. |
| 9,689,967 | B1 | 6/2017 | Stark et al. |
| 9,720,073 | B1 | 8/2017 | Davis et al. |
| 9,753,121 | B1 | 9/2017 | Davis |
| 9,753,132 | B1 | 9/2017 | Bordes et al. |
| 2002/0004692 | A1 | 1/2002 | Nicosia et al. |
| 2002/0075178 | A1 | 6/2002 | Woodington et al. |
| 2002/0155811 | A1 | 10/2002 | Prismantas |
| 2003/0058166 | A1 | 3/2003 | Hirabe |
| 2003/0235244 | A1 | 12/2003 | Pessoa et al. |
| 2004/0012516 | A1 | 1/2004 | Schiffmann |
| 2004/0015529 | A1 | 1/2004 | Tanrikulu et al. |
| 2004/0066323 | A1 | 4/2004 | Richter |
| 2004/0138802 | A1 | 7/2004 | Kuragaki et al. |
| 2005/0069162 | A1 | 3/2005 | Haykin |
| 2005/0201457 | A1 | 9/2005 | Allred et al. |
| 2005/0225476 | A1 | 10/2005 | Hoetzel et al. |
| 2006/0012511 | A1 | 1/2006 | Dooi et al. |
| 2006/0036353 | A1 | 2/2006 | Wintermantel |
| 2006/0109170 | A1 | 5/2006 | Voigtlaender et al. |
| 2006/0109931 | A1 | 5/2006 | Asai |
| 2006/0114324 | A1 | 6/2006 | Farmer et al. |
| 2006/0181448 | A1 | 8/2006 | Natsume et al. |
| 2006/0262007 | A1 | 11/2006 | Bonthron |
| 2007/0018884 | A1 | 1/2007 | Adams |
| 2007/0018886 | A1 | 1/2007 | Watanabe et al. |
| 2007/0109175 | A1 | 5/2007 | Fukuda |
| 2007/0120731 | A1 | 5/2007 | Kelly, Jr. et al. |
| 2007/0132633 | A1 | 6/2007 | Uchino |
| 2007/0152870 | A1 | 7/2007 | Woodington et al. |
| 2007/0152871 | A1 | 7/2007 | Puglia |
| 2007/0152872 | A1 | 7/2007 | Woodington |
| 2007/0164896 | A1 | 7/2007 | Suzuki et al. |
| 2007/0182623 | A1 | 8/2007 | Zeng |
| 2007/0188373 | A1 | 8/2007 | Shirakawa et al. |
| 2007/0200747 | A1 | 8/2007 | Okai |
| 2008/0208472 | A1 | 8/2008 | Morcom |
| 2009/0015459 | A1 | 1/2009 | Mahler et al. |
| 2009/0015464 | A1 | 1/2009 | Fukuda |
| 2009/0073025 | A1 | 3/2009 | Inoue et al. |
| 2009/0079617 | A1 | 3/2009 | Shirakawa et al. |
| 2009/0121918 | A1 | 5/2009 | Shirai et al. |

(56) References Cited

U.S. PATENT DOCUMENTS

| | | |
|---|---|---|
| 2009/0212998 A1 | 8/2009 | Szajnowski |
| 2009/0237293 A1 | 9/2009 | Sakuma |
| 2009/0295623 A1 | 12/2009 | Falk |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0277359 A1 | 11/2010 | Ando |
| 2011/0006944 A1 | 1/2011 | Goldman |
| 2011/0187600 A1 | 8/2011 | Landt |
| 2011/0196568 A1 | 8/2011 | Nickolaou |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0292971 A1 | 12/2011 | Hadani et al. |
| 2012/0001791 A1 | 1/2012 | Wintermantel |
| 2012/0050093 A1 | 3/2012 | Heilmann et al. |
| 2012/0112957 A1 | 5/2012 | Nguyen et al. |
| 2012/0173246 A1 | 7/2012 | Choi et al. |
| 2012/0257643 A1 | 10/2012 | Wu et al. |
| 2013/0016761 A1 | 1/2013 | Nentwig |
| 2013/0027240 A1 | 1/2013 | Chowdhury |
| 2013/0069818 A1 | 3/2013 | Shirakawa et al. |
| 2013/0102254 A1 | 4/2013 | Cyzs |
| 2013/0113653 A1 | 5/2013 | Kishigami et al. |
| 2013/0135140 A1 | 5/2013 | Kishigami |
| 2013/0169485 A1 | 7/2013 | Lynch |
| 2013/0176154 A1 | 7/2013 | Bonaccio et al. |
| 2013/0229301 A1 | 9/2013 | Kanamoto |
| 2013/0244710 A1 | 9/2013 | Nguyen et al. |
| 2013/0314271 A1 | 11/2013 | Braswell et al. |
| 2014/0028491 A1 | 1/2014 | Ferguson |
| 2014/0035774 A1 | 2/2014 | Khlifi |
| 2014/0085128 A1 | 3/2014 | Kishigami et al. |
| 2014/0111372 A1 | 4/2014 | Wu |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0348253 A1 | 11/2014 | Mobasher et al. |
| 2015/0035662 A1 | 2/2015 | Bowers et al. |
| 2015/0061922 A1 | 3/2015 | Kishigami |
| 2015/0198709 A1 | 7/2015 | Inoue |
| 2015/0204966 A1 | 7/2015 | Kishigami |
| 2015/0226848 A1 | 8/2015 | Park |
| 2015/0234045 A1 | 8/2015 | Rosenblum |
| 2015/0247924 A1 | 9/2015 | Kishigami |
| 2015/0301172 A1 | 10/2015 | Ossowska |
| 2015/0323660 A1 | 11/2015 | Hampikian |
| 2016/0003939 A1 | 1/2016 | Stainvas Olshansky et al. |
| 2016/0018511 A1 | 1/2016 | Nayyar et al. |
| 2016/0033631 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0139254 A1 | 5/2016 | Wittenberg |
| 2016/0238694 A1 | 8/2016 | Kishigami |
| 2017/0023661 A1 | 1/2017 | Richert |

FOREIGN PATENT DOCUMENTS

| | | |
|---|---|---|
| FR | 2751086 | 1/1998 |
| WO | WO2015175078 | 11/2015 |
| WO | WO2015185058 | 12/2015 |
| WO | WO2016/011407 | 1/2016 |
| WO | WO2016030656 | 3/2016 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

How Digital Radar work
Applying a Binary Code to the inverter block:
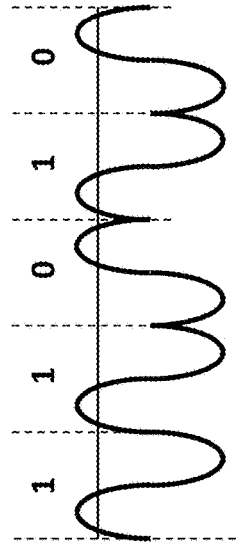
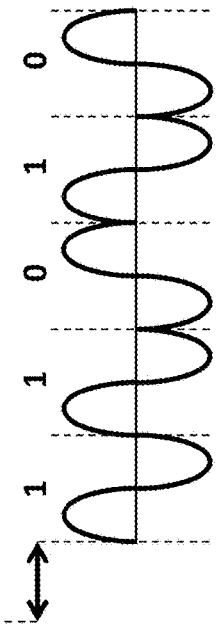
Transmit sequence: 1 1 0 1 0
Receiving a Binary Code :
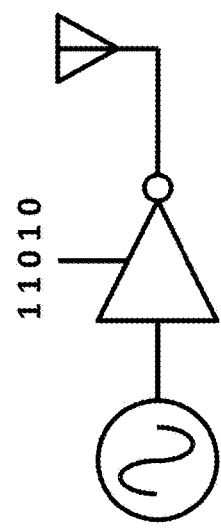
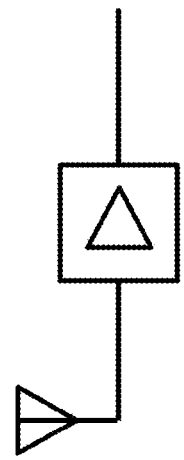
Receive sequence: 1 1 0 1 1 0
The returning wave form is strongly correlated with the used binary code.
FIG. 11

How Digital Radar work

Applying Pseudo Random Binary Code:

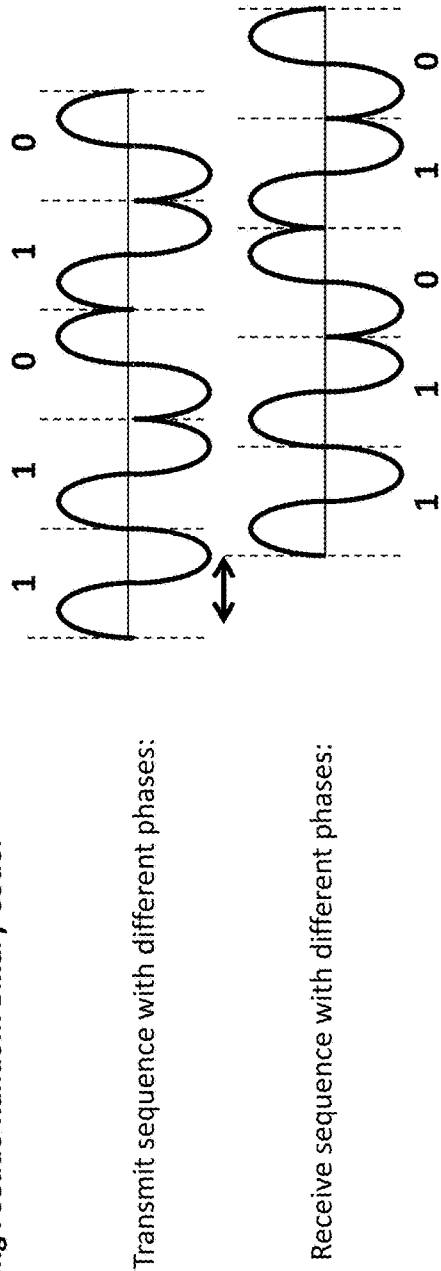

Transmit sequence with different phases:

Receive sequence with different phases:

Advantages for Detection:
- very sharp ambiguity function (thumbtack-like)
  ↑ no range-Doppler ambiguity
- MIMO in code-domain possible (higher angular resolution)
- Interference robustness
- Data from different sensors on different cars can be combined

Advantages for Implementation:
- Much lower ADC resolution required
- No need for high-speed, fast settling frequency synthesizers,
- No linearity requirements (higher range resolution)
- Possibility to embed/transmit information (e.g. vehicle ID)

FIG. 12

ON-DEMAND MULTI-SCAN MICRO DOPPLER FOR VEHICLE

CROSS REFERENCE TO RELATED APPLICATIONS

This application is a divisional of U.S. patent application Ser. No. 15/463,298, filed Mar. 20, 2017, now U.S. Pat. No. 9,753,132, which is a continuation of U.S. patent application Ser. No. 15/204,002, filed Jul. 7, 2016, now U.S. Pat. No. 9,599,702, which claims the filing benefits of U.S. provisional application Ser. No. 62/336,966, filed May 16, 2016, Ser. No. 62/332,544, filed May 6, 2016, and Ser. No. 62/327,004, filed on Apr. 25, 2016, which are all hereby incorporated herein by reference in their entireties.

FIELD OF THE INVENTION

The present invention is directed to radar systems, and in particular to radar systems for vehicles.

BACKGROUND OF THE INVENTION

The use of radar to determine range and velocity of objects in an environment is important in a number of applications including automotive radar and gesture detection. A radar typically transmits a signal and receives the reflection of the signal from objects in the environment.

SUMMARY OF THE INVENTION

The present invention provides methods and a system for achieving higher resolution Doppler measurements (micro-Doppler) for selected targets by combining information from multiple scans. The invention achieves this by processing selected saved portions of Radar Data Cubes ('RDCs') of multiple scans in memory (referred herein as the "save-and-process" method) or on the fly processing of segments of scans (referred herein as the "process-and-integrate" method). After each scan, portions of several scans can be concatenated to form one large RDC which is then processed, or on the fly processing of portions of several recent scans is performed from which a set of concatenated time series can be extracted for subsequent Doppler processing to achieve a higher resolution than is achievable using a single scan.

According to an aspect of the present invention, a radar sensing system for a vehicle includes a transmitter, a receiver, a memory, and a processor. The transmitter is adapted for installation and use on a vehicle, and operable to transmit a radio signal. The receiver is adapted for installation and use on the vehicle, and operable to receive a reflected radio signal. The reflected radio signal is the transmitted radio signal reflected from an object. The transmitted radio signal and the reflected radio signal are provided to a processor. The processor samples the reflected radio signal during a plurality of time slices. Each time slice includes a plurality of samples, a respective sample for each range bin of a plurality of range bins in each time slice. The processor produces each of the samples by correlating the reflected radio signal to time-delayed replicas of the transmitted radio signal. The processor accumulates the plurality of time slices into a first radar data cube. The processor stores a portion of the first radar data cube in a memory. The processor combines the portion of the first radar data cube with a portion of a previously stored radar data cube. Based at least in part on the combined portion of the first radar data cube and the portion of the previously stored radar data cube, the processor processes a time series that is a time series of the portion of the first radar data cube concatenated with a time series from the portion of the previously stored radar data cube.

According to an aspect of the present invention, a radar sensing system for a vehicle includes a plurality of transmitters, a receive pipeline comprising a plurality of receivers, and a processor. The plurality of transmitters are configured for installation and use in a vehicle, and are operable to transmit radio signals. The plurality of receivers are configured for installation and use on the vehicle, and are operable to receive radio signals. The received radio signals are transmitted radio signals that are reflected from an object. The receive pipeline is able to correlate received radio signals of the plurality of receivers with a plurality of time-delayed replicas of the transmitted radio signals to produce samples comprising complex-valued digitized samples. Each time-delayed replica of the plurality of time-delayed replicas of the transmitted radio signals corresponds with a particular range bin of a particular receiver of the plurality of receivers. The samples are produced during a first plurality of time slices of a first scan. A time slice of the first plurality of time slices comprises a two-dimensional array of samples, the two-dimensional array defined by the plurality of receivers and a respective plurality of range bins for each receiver of the plurality of receivers. Each range bin of each respective plurality of range bins contains a sample from the respective receiver of the plurality of receivers. The first plurality of time slices is accumulated into a first three-dimensional array during the first scan. The receive pipeline is further operable to produce samples during a second plurality of time slices of a second scan. The second plurality of time slices is accumulated into a second three-dimensional array during the second scan. The receive pipeline is further operable to output the first and second three-dimensional arrays to a processor. The processor is able to (a) selectively process a portion of the first three-dimensional array, (b) produce a first partial Doppler output, (c) discard the first three-dimensional array, and (d) save the first partial Doppler output into memory. The portion of the first three-dimensional array comprises less than the entire first three-dimensional array. The portion of the first three-dimensional array comprises a first time series of samples for the at least one range bin of each receiver of the plurality of receivers. The processor is further able to selectively process a second time series of samples from a second three-dimensional array to produce a second partial Doppler output. The processor stores the second partial Doppler output into the memory by numerically accumulating the second partial Doppler output with the first partial Doppler output.

According to an aspect of the present invention, a radar sensing system for a vehicle includes one or more transmitters, a receive pipeline comprising one or more receivers, a memory, and a processor. The one or more transmitters are adapted for installation and use on a vehicle, and are operable to transmit radio signals. The receive pipeline is adapted for installation and use on the vehicle, and operable to receive radio signals. The received radio signals are the transmitted radio signals that are reflected from an object. The receive pipeline is operable to correlate received radio signals of the one or more receivers with a plurality of time-delayed replicas of the transmitted radio signals to produce complex valued digitized samples (samples). Each time-delayed replica of the plurality of time-delayed replicas of the transmitted radio signals corresponds with a particular range bin of a particular receiver. The samples are produced during a first plurality of time slices of a first scan. The first plurality of time slices are accumulated into a first three-dimensional array during the first scan. A time slice comprises a two-dimensional array of samples, the two-dimensional array defined by the one or more receivers and a respective plurality of range bins for each receiver, such that each range bin of each respective plurality of range bins contains a sample from the respective receiver of the one or more receivers. The receive pipeline is further operable to produce the samples during a second plurality of time slices of a second scan. The second plurality of time slices are accumulated into a second three-dimensional array during the second scan. The receive pipeline is further operable to output the first and second three-dimensional arrays to a processor. The processor is operable to store a portion of the first three-dimensional array in a memory. The portion of the first three-dimensional array comprises a first time series of samples from at least one range bin of each receiver. The processor is further yet operable to store a portion of the second three-dimensional array into the memory. The portion of the second three-dimensional array comprises a second time series of samples for the at least one range bin of each receiver. The processor is further yet operable to combine the portion of the second three-dimensional array to the portion of the first three-dimensional array and store the combined three-dimensional array in the memory. The portion of the second three-dimensional array is combined to the portion of the first three-dimensional array by concatenating the second time series of samples for the at least one range bin of each receiver to the first time series of samples for the at least one range bin of each receiver. The processor is further yet operable to Doppler process the concatenated first and second time series of samples for the at least one range bin of each receiver of the plurality of receivers by performing a Fourier analysis, such as a Fast Fourier Transform, on each of the concatenated first and second time series of samples.

In accordance with an aspect of the present invention, a method for achieving high resolution Doppler measurements for a vehicle radar sensing system includes providing a radar sensing system comprising a plurality of transmitters and a plurality of receivers and a processor for processing signals received by the receivers. The received signals are sampled during a plurality of time slices such that each time slice comprises a plurality of samples, a respective sample for each range bin of each receiver of the time slice. The samples are produced by correlating the reflected radio signal to time-delayed replicas of the transmitted radio signal. The plurality of time slices form a first radar data cube. Each sample comprises a complex valued sample of the signals. At least a portion of the first radar data cube is stored in a memory. Only a subset of the first radar data cube is identified and saved in the memory. The subset comprises a time series of samples from each receiver for a particular range bin, or bins, of interest. The subset of the first radar data cube is combined with a previously stored one or more subsets of additional radar data cubes. A time series of samples that is a time series of the subset of the first radar data cube concatenated with time series from the previously stored subsets of the one or more additional radar data cubes are processed.

A concatenated first and second time series of samples provides a higher Doppler resolution than the first time series. The higher Doppler resolution is achieved during the second scan. The first scan and second scan may be of a same duration or of different durations. The first and second time series may be delayed by an arbitrary time interval, and a corresponding number of samples may be inserted into a concatenated time series between the samples from each scan to form a uniformly sampled time series.

The Doppler processing may be performed on time series synthesized from the time series data from two or more range bins. Further post-processing after the Doppler processing may be performed to establish an angle of arrival for each Doppler output.

These and other objects, advantages, purposes and features of the present invention will become apparent upon review of the following specification in conjunction with the drawings.

BRIEF DESCRIPTION OF THE DRAWINGS

FIGS. 10-12 illustrate aspects of how digital radar works;

DESCRIPTION OF THE PREFERRED EMBODIMENTS

Figure 1:
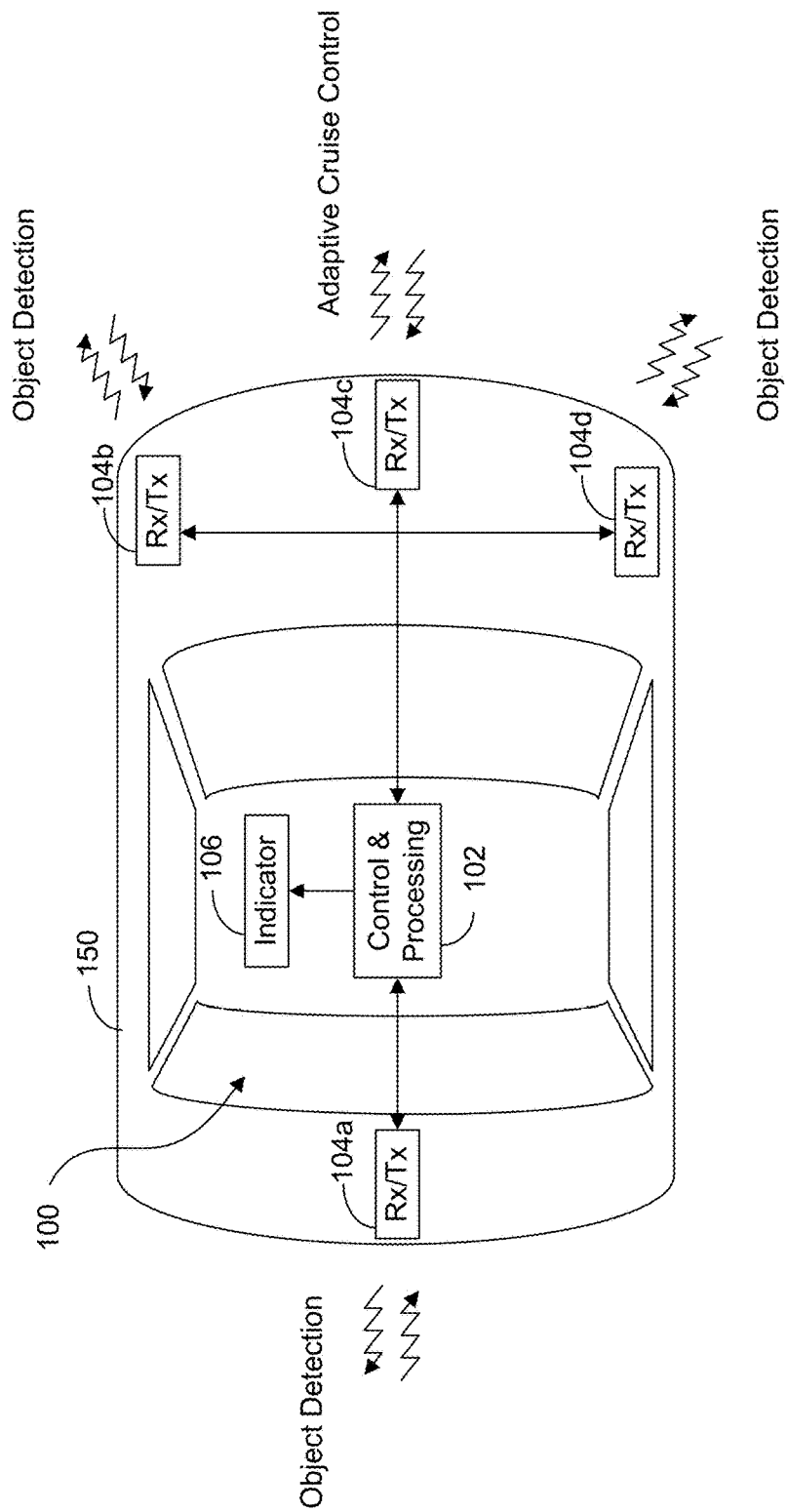
FIG. 1 is a plan view of an automobile equipped with a radar system in accordance with the present invention.

The present invention will now be described with reference to the accompanying figures, wherein the numbered elements in the following written description correspond to like-numbered elements in the figures. Methods and systems of the present invention may achieve higher resolution Doppler measurements than conventional methods for a given scanning time period, processing load, and memory allocation. Such higher resolution Doppler measurements for selected targets are achieved by combining information from a current scan with stored information from previous scans (for example, a preferred Doppler measurement is 1 meter per second (m/s), more preferably 0.1 m/s, and most preferably less than 0.05 m/s). The stored information may include entire three-dimensional data sets (also known as radar data cubes) or portions of radar data cubes acquired during previous scans. A "scan" is a time period over which radar-sensed information is acquired and accumulated. During a scan, information is acquired and accumulated over a series of discrete and individual time intervals into a single radar data cube.

A radar system utilizes one or more transmitters to transmit signals, which are received as reflected signals (e.g., reflected from a target/object) by one or more receivers of the radar system. The receivers of the radar system may be considered part of a receive pipeline that outputs complex valued digitized samples (i.e., values comprising a mathematical real component and a mathematical imaginary component) to a processor. The complex valued digitized samples are produced based on correlations between the reflected signals and time-delayed replicas of the transmitted signals. These samples are arranged in two-dimensional arrays known as time slices. The samples are placed into respective range bins of the two-dimensional array (as used herein, a range bin refers to a distance range corresponding to a particular time delay corresponding to the round trip time of the radar signal from a transmitter, to the target/object, and back to the receiver). The receivers of the radar system define an x-axis of the two-dimensional time slice and the range bins define a y-axis of the two-dimensional time slice. Another time slice comprising complex valued samples is generated every 2-30 microseconds. Over a longer time interval, herein referred to as a "scan" (typically, in a duration of 1-60 milliseconds or longer), multiple time slices are accumulated to form a three-dimensional radar data cube. An x-axis of the three-dimensional radar data cube is defined by time (with each respective time slice requiring 2-30 microseconds), while the receivers (or virtual receivers) define a z-axis of the three-dimensional radar data cube and the range bins and their corresponding time delays define a y-axis of the three-dimensional radar data cube. A radar data cube may have a preselected or dynamically defined quantity of time slices. For example, a radar data cube may include a 100 time slices or a 1000 time slices of data. While scans may have variable time durations, other scan parameters, such as the duration of a single time slice, etc., should be substantially the same.

The complex valued samples of the received signals are the product of a correlation between multiple time-delayed replicas of the transmitted signals—with a time-delayed replica corresponding to each range bin—and the received signals. When a particular time-delayed replica in a particular range bin correlates highly with the received signal, it is an indication of the time delay (i.e., range of the target/object) for the transmitted signal that is received after reflecting from a target/object. As discussed herein, each time slice contains one sample in a time series of samples upon which Doppler processing is performed (e.g., Fast Fourier Transform). In other words, a time series of samples comprises the samples of a particular range bin for a particular receiver (or virtual receiver). The longer the chain of time series of samples, the higher the Doppler resolution.

The transmitted radio signals are reflected from objects in the environment and are received back at the radar receivers (or virtual receivers). The transmitted signal from each radar transmitter consists of a baseband signal which is upconverted to an RF signal by an RF upconverter followed by an antenna. The received signal at each radar receiver antenna is downconverted by an RF downconverter to a complex baseband signal. The baseband transmitted radio signals and the reflected radio signals after downconversion in the receiver are provided to the processor. As an example, a baseband signal used for transmission might consist of repeated sequences of binary values for one transmitter, e.g., (−1, −1, −1, −1, 1, 1, 1, −1, 1, 1, −1, −1, 1, −1, 1), although any sequence, including non-binary sequences and non-periodic sequences could be used and different sequences would be used for different transmitters. The signal can be upconverted to an RF signal by mixing the signal with a local oscillator. At the receiver (receive pipeline), the received signal is downconverted by typical amplification, filtering, and mixing with in-phase and quadrature-phase components of an oscillator. The resulting signal after downconversion is correlated with different delays (time shifts) of replicas of the transmitted sequence to produce a complex correlation value for each period of the binary sequence. A particular correlator that has a replica that is matched in delay to the time delay of the reflected signal from an object would produce a large magnitude complex correlator output. A single correlator will produce a sequence of correlator outputs that will be large if the reflected signal has a delay that matches the delay of the replica of the baseband transmitted signal. If there is a different velocity of the radar system and the object causing the reflection, there will be a Doppler shift in the frequency of the reflected signal relative to the transmitted signal. A sequence of correlator outputs for one particular delay will have complex values that rotate at a rate related to the Doppler shift. Using a sequence of correlator outputs (also referred to as a scan), the Doppler shift may be estimated and thus the velocity of the object in the environment. The longer the sequence of correlator outputs used to estimate the Doppler frequency, the greater the accuracy and resolution of the estimation of the Doppler frequency, and thus the greater accuracy in estimating the velocity of the object.

There may be scans for different correlators that use replicas of the transmitted signal with different delays. Because there are multiple transmitters and multiple receivers, there may be correlators that process a received signal at each receiver that are matched to a particular transmitted signal by a particular transmitter. Each pair of transmitter-receiver is called a "virtual receiver" (a radar system preferably has 4 virtual receivers, or more preferably 32 virtual receivers, and most preferably 256 or more virtual receivers). The receive pipeline of the radar system will thus generate a sequence of correlator outputs for each possible delay and for each virtual receiver. This set of data is called a radar data cube (RDC). The delays are also called range bins. The part of the radar data cube for one point in the sequence of correlator outputs is called a time slice, and it contains one correlator output for each range bin and virtual receiver combination. Storing the radar data cube can involve large amount of memory, as its size depends on the desired number of virtual receivers (for example, 4-64 or more virtual receivers), the desired number of range bins (for example, 100-500 or more range bins), and the desired number of time slices (for example, 200-3000 or more time slices).

The complex valued digitized samples contained in a three-dimensional radar data cube may be processed, preferably by a processor established as a CMOS processor and coprocessor on a common/same semiconductor substrate, typically a silicon substrate. In one embodiment, the processor comprises fixed function and programmable CPUs and/or programmable logic controls (PLCs). Preferably, the system will be established with a radar system architecture (including, for example, analog RF circuitry for the radar, processor(s) for radar processing, memory module(s), and other associated components of the radar system) all on a common/same semiconductor substrate. The system may preferably incorporate additional processing capabilities (such as, for example, image processing of image data captured by one or more vehicle cameras such as by utilizing aspects of the systems described in U.S. Pat. Nos. 5,877,897; 5,796,094; 6,396,397; 6,690,268 and 5,550,677, which are hereby incorporated herein by reference in their entireties) within the common/same semiconductor substrate as well.

The ability of a continuous wave radar system to distinguish multiple targets is dependent upon the radar system's range, angle, and Doppler resolutions. Range resolution is limited by a radar's bandwidth (i.e., the chip rate in a phase modulated continuous wave radar), while angle resolution is limited by the size of the antenna array aperture. Meanwhile, increasing Doppler resolution only requires a longer scan. A high Doppler resolution is very valuable because no matter how close two objects or targets are to each other, as long as they have slightly differing radial velocity (their velocity towards or away from the radar system), they can be distinguished by a radar system with a high enough Doppler resolution. Consider a walking adult next to a walking child, where the adult is moving towards the radar system at 1.5 meters per second while the child is moving towards the radar system at 1.2 meters per second (ignoring how fast the radar system may be moving). If the Doppler resolution of the radar system is high enough, the radar system will be able to distinguish the two targets. However, if the radar system is only able to achieve Doppler resolutions of up to an exemplary 0.5 meters per second, the radar system will be unable to distinguish the two targets. Preferably, the Doppler resolution is 1 meter per second (m/s), more preferably 0.1 m/s, and most preferably less than 0.05 m/s.

Therefore, a longer scan will allow the radar system to distinguish targets moving at ever smaller velocity differences. However, there are practical limitations on the length of a scan. For example, a scan length (that is, the number of time slices accumulated in a single scan) is limited by memory usage and update requirements. The updates may be sent to a display, but more typically to some other control unit. Collecting and storing the complex valued samples needed to determine the range and velocity of each object corresponding to each virtual receiver requires significant memory resources. The required memory resources may run into the tens of megabytes to 100 megabytes, or more. For example, the amount of memory necessary to store the data for a single scan of 1000 time slices from 64 virtual receivers when that scan accumulates the complex valued samples across 100 range bins for the 64 virtual receivers would require more than 25 megabytes.

Even if memory was not a consideration, radar update/refresh requirements may limit the length of a scan (i.e., the number of time slices accumulated in a single scan). For example, because each time slice requires 2-30 microseconds, a quantity of time slices that can be accumulated in a single scan will be limited because the length of time necessary to accumulate the time slices will be defined by the quantity of time slices (2-30 microseconds multiplied by the quantity of time slices). The above described processing will not begin until all of the time slices have been accumulated and stored into memory. Obviously, the greater the number of time slices in a scan, the longer the time length of a scan, and a longer latency between successive radar images or outputs. Increased latency may cause processing difficulties. Additionally, during longer scans, targets may move across multiple range bins, making it more difficult to detect and accurately determine their position.

Therefore, as discussed herein, while a longer scan will provide a higher Doppler resolution, versus a shorter scan (such as, for example, a scan of 500 time slices may provide for a maximum Doppler resolution of 2.0 m/s, while a scan of 2,000 time slices may provide for a maximum Doppler resolution of 0.5 m/s, a 4× increase), conventional radar systems are limited by the several constraints listed above. In accordance with an aspect of the present invention, a longer scan with a resulting higher Doppler resolution, including micro-Doppler resolution, may be achievable. Such a longer scan may be achieved without running into the above discussed constraints, as discussed herein. In accordance with an aspect of the present invention, there are preferably 200 time slices accumulated in a radar data cube, more preferably 800 time slices, while most preferably there are 3000 or more time slices accumulated in the radar data cube.

When there are sufficient memory resources, a first radar data cube formed during a first scan (that remains within the required constraints) may be stored in memory, processed, and the radar output updated. Next, a second radar data cube formed during a subsequent scan of similar length may be stored in the memory. Then, the second radar data cube may be concatenated with the stored first radar data cube to form a combined, longer radar data cube. The combined radar data cube is then processed and the radar output updated (depending on specific needs, the radar system may choose to process either the entire combined radar data cube, or a subset of the per-range bin or virtual receiver time series). In this example, the longer radar data cube, as if formed during a longer scan, contains twice the number of time slices, but doesn't add to the length of time required to accumulate the time slices for the second radar data cube. By reusing the previously stored radar data cube accumulated during the first scan, the subsequent scan may be made longer without the additional time requirements of a longer scan (by concatenating the first radar data cube with the second radar data cube). Obviously, additional previous scans may be stored and concatenated to make an even longer scan. The quantity of previous scans may be limited by memory allocation and processing resources.

As discussed herein, to efficiently utilize available memory resources, instead of storing the entire previous radar data cube, one or more selected range bins may be stored (which may be referred to as "range slices"). The selected range bins (range slices) may be identified from previous lower resolution scans that identity targets of interest. For example, for an automobile radar application, if a slow moving target is detected near a predicted path of the equipped vehicle, a higher Doppler resolution may be used to determine whether the target is a pedestrian or cyclist, another vehicle, or just clutter. Therefore, a first radar data cube formed during a first scan (that remains within the required constraints) is stored in memory and processed, with one or more selected range bins (range slices) retained in memory. Next, a second radar data cube formed during a subsequent scan of similar length is stored in the memory. The selected and retained range bins (range slices) from the first scan are concatenated with corresponding range bins of the second radar data cube accumulated during the subsequent scan. In this example, the concatenated range bins or range slices are processed. By reusing the previously stored range bins or range slices selected from the first radar data cube accumulated during the first scan, the subsequent scan may be made longer without requiring the additional time requirements of a longer scan (by concatenating the previously stored range bins selected from the first radar data cube with corresponding range bins of the second radar data cube). By only storing selected range bins or range slices, the memory allocation and processing resource requirements will be smaller.

Therefore, by storing a previously processed radar data cube (or a portion of the previously processed radar data cube) that was accumulated during a previous scan, a subsequent radar data cube accumulated during a current scan may be concatenated with the previous radar data cube (or a selected portion of the previous radar data cube), to realize a longer radar data cube, as if accumulated during a longer scan. For example, the process may include the following steps: (1) accumulate and store a first radar data cube, (2) perform normal processing on the first cube, (3) identify a set of range bins to preserve from the first radar data cube, (4) discard any other range bins from the first radar data cube, (5) accumulate and store a second radar data cube, (6) perform normal processing on the second radar data cube, (7) preserve the same range bins from the second radar data cube as were previously preserved from the first radar data cube, (8) discard the remaining range bins from the second radar data cube, (9) concatenate the preserved range bins from the first and second radar data cubes, and (10) perform super-resolution Doppler processing on the concatenated range bins.

FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more virtual receivers 104a-104d, control and processing module 102 and indicator 106. Other configurations are also possible. FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

Figure 2A:
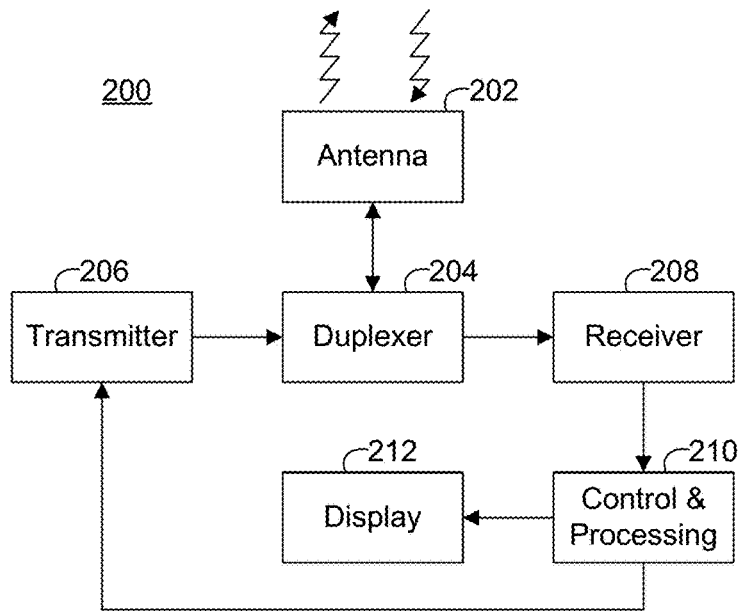
FIG. 2A and FIG. 2B are block diagrams of radar systems in accordance with the present invention.
Figure 2B:
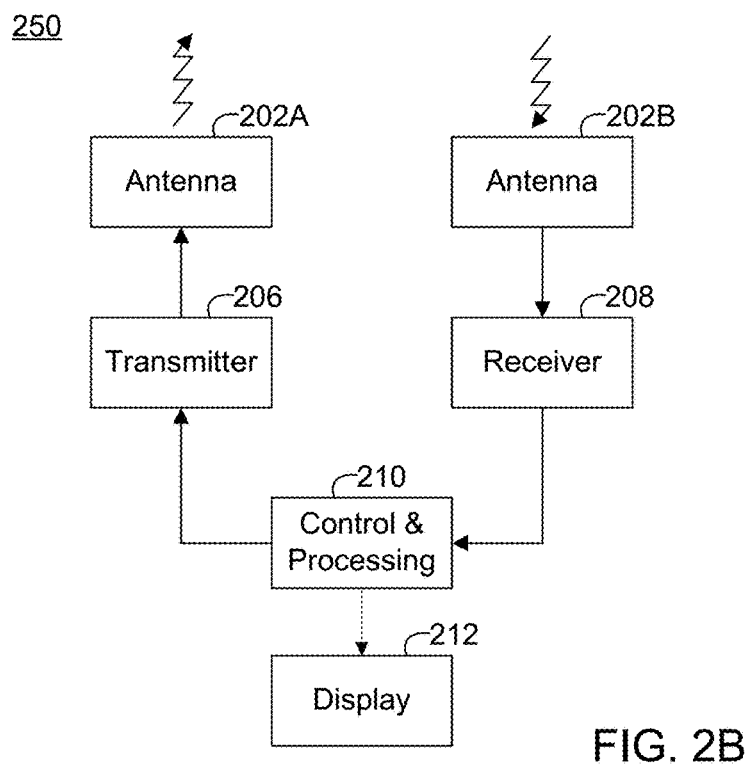

FIG. 2A illustrates an exemplary radar system 200 with an antenna 202 that is time-shared between a transmitter 206 and a receiver 208 via a duplexer 204. As also illustrated in FIG. 2A, output from the receiver 208 is received by a control and processing module 210 that processes the output from the receiver 208 to produce display data for the display 212. As discussed herein, the control and processing module 210 is also operable to produce a radar data output that is provided to other control units. The control and processing module 210 is also operable to control the transmitter 206. FIG. 2B illustrates an alternative exemplary radar system 250 with a pair of antennas 202a, 202b, a separate antenna 202a for the transmitter 206 and another antenna 202b for the receiver 208. While pulse radar systems may use shared or separate antennas, continuous wave radars (discussed herein) will use separate antennas (for transmitting and receiving) because of their continuous operation.

The radar sensing system of the present invention may utilize aspects of the radar systems described in U.S. provisional applications, Ser. No. 62/319,613, filed Apr. 7, 2016, Ser. No. 62/327,003, filed Apr. 25, 2016, Ser. No. 62/327,005, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, Ser. No. 62/327,017, filed Apr. 25, 2016, Ser. No. 62/327,018, filed Apr. 25, 2016, and Ser. No. 62/338,792, filed May 19, 2016, which are all hereby incorporated by reference herein in their entireties.

In a radar system, achieving high Doppler resolution requires long scans. Practical limitations on the length of a scan, such as memory usage, and the desire to obtain frequent updates from the radar, limit the maximum achievable Doppler resolution in a single scan. Typical scans may be able to achieve Doppler resolutions of up to 0.1 meters/second. The present invention provides a system and method and device for achieving higher resolution Doppler measurements (micro-Doppler) for selected targets by combining information from multiple scans.

There are several types of signals used in radar systems. One type of radar signal is known as a frequency modulated continuous waveform (FMCW). In this type of system, the transmitter of the radar system sends a continuous signal in which the frequency of the signal varies. This is sometimes called a chirp radar system. At the receiver a matched filter can be used to process the received signal. The output of the matched filter is a so-called "pulse-compressed" signal with a pulse duration inversely proportional to the bandwidth used in the chirp signal.

Figure 10:
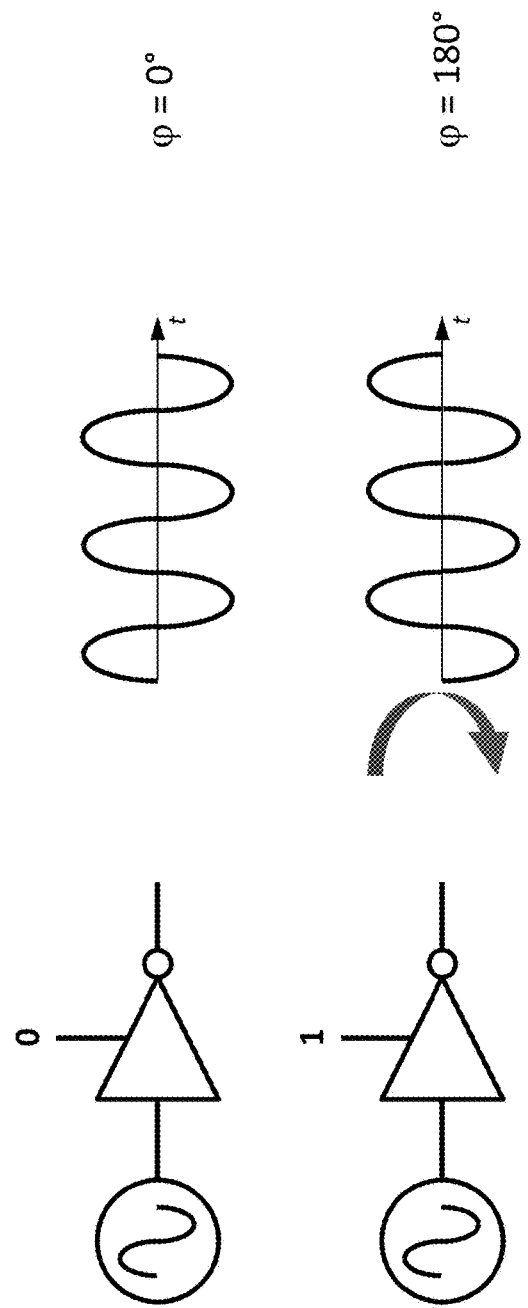

Another type of radar signal is known as a phase modulated continuous waveform (PMCW). For this type of signal, the phase of the transmitted signal is changed according to a certain pattern or code, sometimes called the spreading code, known at the radar receiver (see FIGS. 10-12). The faster the phase is changed, the wider the bandwidth of the transmitted signal. This is sometimes called spread-spectrum because the signal power is spread over a wide bandwidth. As illustrated in FIGS. 10-12, the pattern may be implemented as a pseudo random binary code, where 1s and 0s indicate a positive or negative phase shift. As also illustrated in FIGS. 11 and 12, a phase shift doesn't always affect the waveform (e.g., a binary code sequence of 1, 1 or 0, 0 does not change the phase of the waveform for the second 1 or 0). In an aspect of the present invention, there may be different types of codes, with each transmitter of a radar system using a separate code. In other modes each transmitter transmits with a single code that is modulated according to a Hadamard transform.

At the receiver, a matched filter is used that produces a so-called pulse compressed signal with time resolution proportional to the inverse bandwidth of the transmitted signal. Codes with good autocorrelation values are important in single transmitter, single receiver, phase modulated continuous wave radars.

Radars with a single transmitter and a single receiver can determine distance to a target but cannot determine a direction or an angle of a target from the radar sensor or system. To achieve angular information, either multiple transmitters or multiple receivers or both are needed. The larger the number of transmitters and receivers, the better the resolution possible. A system with multiple transmitters and multiple receivers is also called a multiple-input, multiple-output or MIMO system. With multiple transmitter, multiple receiver radar systems, the receive pipeline of the radar system will have a matched filter for each of the transmitter codes. As discussed herein, a number of virtual receivers is defined by the number of transmitters and physical receivers (quantity of transmitters times quantity of physical receivers equals the quantity of virtual receivers). A receiver may be referred to as a virtual receiver. A radar system with only a single transmitter will have virtual receivers that are physical receivers, but may still be referred to as virtual receivers.

One type of radar system transmits the same type of signal continuously. The signal might be a frequency modulated continuous wave (FMCW) type of waveform that sweeps a continuous wave (CW) signal in frequency across some range of frequencies. Mixing (multiplying) the reflected wave from a target with a replica of the transmitted signal results in a CW signal with a frequency that represents the distance between the radar transmitter/receiver and the target. By sweeping up in frequency and then down in frequency the Doppler frequency can also be determined. Phase modulated continuous wave (PMCW) on the other hand transmits a signal in which the phase is modulated (e.g., with two values $\pi$ and $-\pi$). For a single transmitter, a sequence of phase values—sometimes called a spreading code—that has good autocorrelation properties is required so that ghost targets are minimized. The rate at which the phase is modulated determines the bandwidth of the transmitted signal.

A radar determines the range of an object or the distance to an object by determining how long it takes the echo of the transmitted signal to be heard back at the receive pipeline of the radar. From this measured time delay and knowing that the electromagnetic signals travel at the speed of light (or ultrasonic signals travel at the speed of sound) the distance can be determined. A typical way of determining the time delay is by correlating the received signal with multiple time-delayed replicas of the transmitted signal (via the use of range bins, as discussed herein). When a particular time-delayed replica corresponding to a particular range bin correlates highly with the received signal (which results in a larger amplitude signal as compared to a signal that does not correlate highly with the received signal), it is an indication of the time delay for the transmitted signal that is received after reflecting from an object. Because there can be multiple objects in the environment, there will be multiple time delays for which there will be high correlation. While a virtual receiver could correlate the received signal with all possible delays, generally there is a finite set of delays with which the virtual receiver will correlate (i.e., the range bins).

The ranges corresponding to the different time delays generated by replica signals are the above mentioned range bins. They may also be known as "range gates." The accuracy of range determination increases as the bandwidth of the transmitted signal increases (as the rate at which the phase of the signal changes) and as the number of time-delay replicas increase. A virtual receiver that uses a matched filter may generate correlation values for all possible time delays (each range bin). This matched filter receiver will still have a range resolution that depends on the bandwidth of the transmitted signal.

A radar system can determine the velocity of an object by measuring the frequency offset between the transmitted signal and the received signal. The signal reflecting from a moving object will have a frequency shift relative to the transmitted signal. This is called the Doppler Effect and the frequency shift is called the Doppler Shift. Doppler is most noticeable with regards to trains passing through a road crossing where the frequency of the sound will go down once the train has passed the road crossing. The signal reflected off an object moving toward the radar sensor will have a higher frequency than the transmitted signal, and an object moving away will have a lower frequency. If the radar sensor is also moving, then it is the relative velocity between the radar sensor and the object that will determine the amount of frequency shift. Thus, measuring the frequency shift will determine the relative velocity of an object in the environment. The time duration of the transmitted signal will determine the accuracy or resolution of the Doppler frequency.

The correlation of replicas of the transmitted signal modified at different time delays and different frequency shifts is called the ambiguity function. It is the correlation at different delays and different frequency shifts which are an indication of the range and velocity of the objects in the environment. A virtual receiver calculating the ambiguity function can estimate the range and velocity of objects in the environment.

Because there can be multiple objects in the environment with different ranges and different velocities there may be multiple reflections with different delays and different frequency shifts. It is important in many applications to measure the frequency shift for different objects at different ranges to determine the velocity of individual objects. Each object in a given range will generate a frequency shift that should be estimated.

The frequency shift of a received signal at a particular range bin can be measured by looking at the sequence of phase values of the correlator output of the receive pipeline over a set of correlations. The phase shift $\Delta \phi$ between two consecutive correlator outputs that are separated in time $\Delta T$ will correspond to a frequency shift, $\Delta f$, that can be determined as $\Delta f = \Delta\phi/\Delta T$. The longer the time duration of the transmitted signal, the more accurate the determination of frequency shift of an object at a particular range bin.

Figure 13:
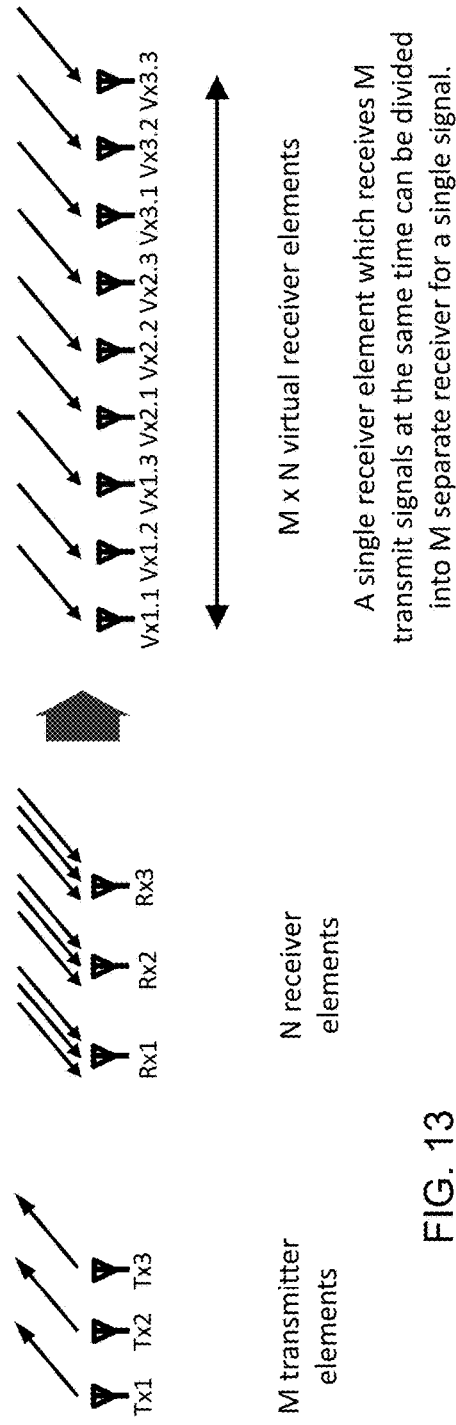
FIG. 13 illustrates capabilities of a multiple transmitter and multiple receiver radar system.

While the description above focused on a single transmitter-receiver pair, if there are $N_T$ transmitters and $N_R$ receivers there will be $N_T \times N_R$ virtual radars, one for each transmitter-receiver pair. For example, a radar system with eight transmitters and eight receivers will have 64 pairs or simply 64 virtual radars or 64 virtual receivers. As illustrated in FIG. 13, when three transmitters (Tx1, Tx2, Tx3) are being received by three receivers (Rx1, Rx2, Rx3), each of the receivers is receiving the transmission from each of the transmitters. Because each of the receivers is receiving all three of the transmissions at the same time, the physical receivers may be "divided" into three separate virtual receivers, each virtual receiver receiving a respective one of the received signals. In a preferred radar system of the present invention, there are 1-4 transmitters and 4-8 receivers, or more preferably 4-8 transmitters and 8-16 receivers, and most preferably 16 or more transmitters and 16-64 or more receivers.

Collecting and storing all the information to determine the range and velocity of each object corresponding to each virtual receiver requires significant memory resources. The required memory resources necessary to achieve sufficient Doppler resolution may run into the tens of megabytes to a 100 megabytes or more. For example, the amount of memory necessary to store the data for a single scan of 1000 time slices from 64 virtual receivers when that scan accumulates samples across 100 range bins for the 64 virtual receivers would be more than 25 megabytes (see FIG. 3). In accordance with an aspect of the present invention, there are preferably 100 range bins, more preferably 200 range bins, and most preferably 500 range bins in each time slice.

Figure 6:
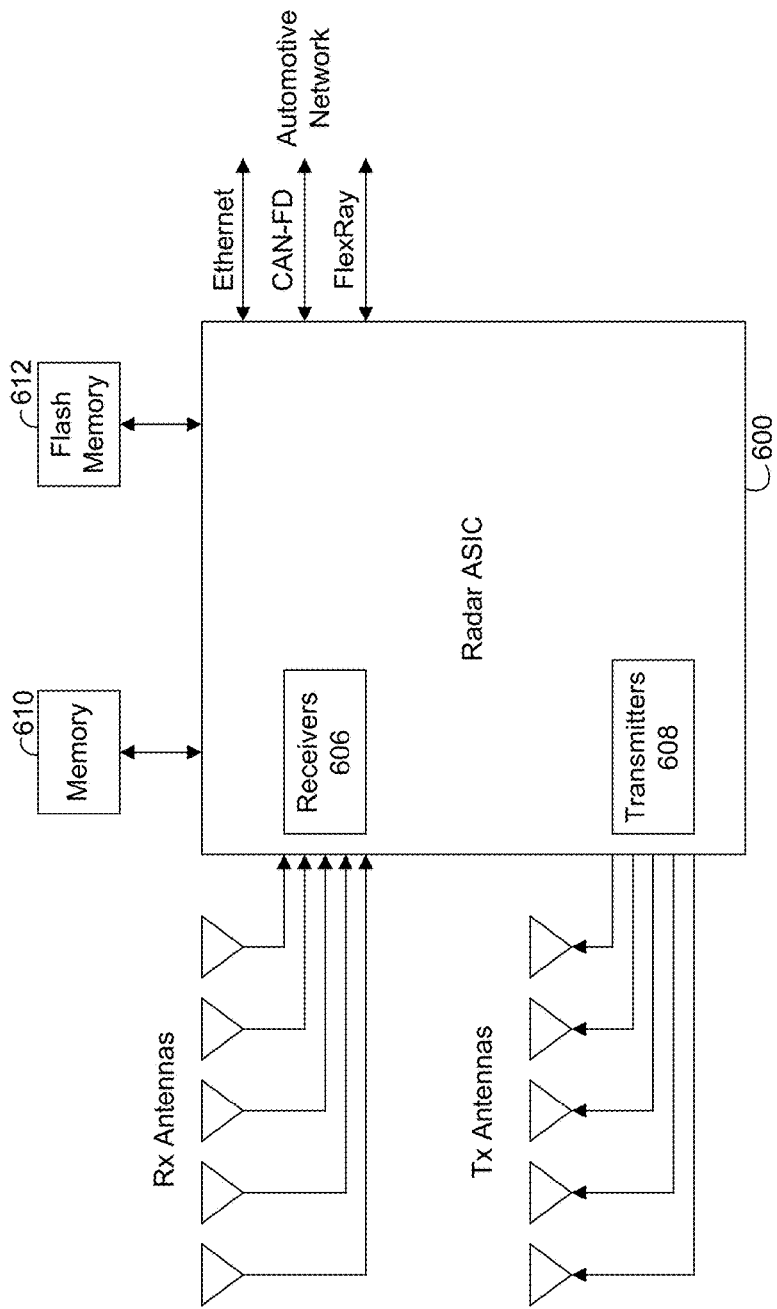
FIG. 6 is a block diagram illustrating a radar system with a plurality of receivers and a plurality of transmitters in accordance with the present invention.

FIG. 6 illustrates an exemplary phase modulated continuous wave radar system 600. As illustrated in FIG. 6, the radar system 600 comprises a plurality of receivers and their respective antennas 606 and a plurality of transmitters and their respective antennas 608. The radar system 600 also includes a flash memory 612, and optionally a random access memory 610. The random access memory 610, for example, an external DRAM, may be used to store radar data cube(s) instead of using the limited internal (on-chip) memory (e.g., SRAM), and may also be used to store selected range bins from a greater number of radar data cubes for concatenating for micro-Doppler processing. The radar system also includes a variety of interconnections to an automotive network, e.g., Ethernet, CAN-FD, and Flexray.

It is important to get an initial coarse estimate of the Doppler frequency because it can be performed using individual scan(s) with lower Doppler resolution and does not require multiple scans to be stored in memory. Furthermore, while using individual scans, Doppler resolution is limited by the length of each scan (i.e., micro-Doppler is not available), and it allows the radar to identify a small number of range bins or range slices on which to perform micro-Doppler processing. That is, a set of range bins or range slices whose range data cube (RDC) data should be saved across several consecutive scans, then concatenated for micro-Doppler processing. Exemplary embodiments of the present invention provide for on-demand Doppler resolution adjustments, where the Doppler resolution may be dynamically adjusted to a higher Doppler resolution after one or more low resolution coarse estimates. Dynamic Doppler resolution adjustments may therefore allow for rapid and low processing cost, low-Doppler resolution estimates to identify potential objects or targets of interest that may then require more complicated higher Doppler resolutions (up to and including micro-Doppler processing).

Radars have the ability to measure a target's range and angle (azimuth and elevation), and Doppler velocity (range rate of change). The primary metrics in each of these measurements are resolution and accuracy. Resolution is particularly important because it allows the radar to distinguish (resolve) targets that are closely spaced in range, angle, or Doppler velocity. Range resolution is limited by the radar's bandwidth—chip rate in a PMCW radar. Angle resolution is limited by the size of the antenna array aperture. It is quite common that two neighboring targets cannot be resolved in range or in angle due to physical limitations of the radar. Increased Doppler resolution, on the other hand, only requires a longer scan. No matter how close two targets are to each other, as long as they have slightly differing radial velocity, they can be distinguished by a radar with a high Doppler resolution capability. Two examples are (1) a pedestrian walking out into the roadway from between two cars parked along the side of the road, and (2) a motorcycle driving alongside a truck. Another reason that micro-Doppler is important is that it enables better classification of targets. Given sufficient Doppler resolution, a target can be classified as a pedestrian by the distinctive back-and-forth motion of the legs and arms. Similarly, a target can be classified as a bicycle by the motion of the wheels and of the pedals (and of the crank and the rider's legs).

As noted herein, achieving the required high Doppler resolution requires long scans. Practical limitations on the length of a scan, such as memory usage, and the desire to obtain frequent updates from the radar, limit the maximum achievable Doppler resolution in a single scan. The present invention provides a method and device for achieving higher resolution Doppler measurements (micro-Doppler) for selected targets by combining information from multiple scans. In accordance with an aspect of the present invention, the Doppler resolution is preferably less than 1 meter per second (m/s), or more preferably less than 0.1 m/s, and most preferably less than 0.05 m/s.

Figure 3:
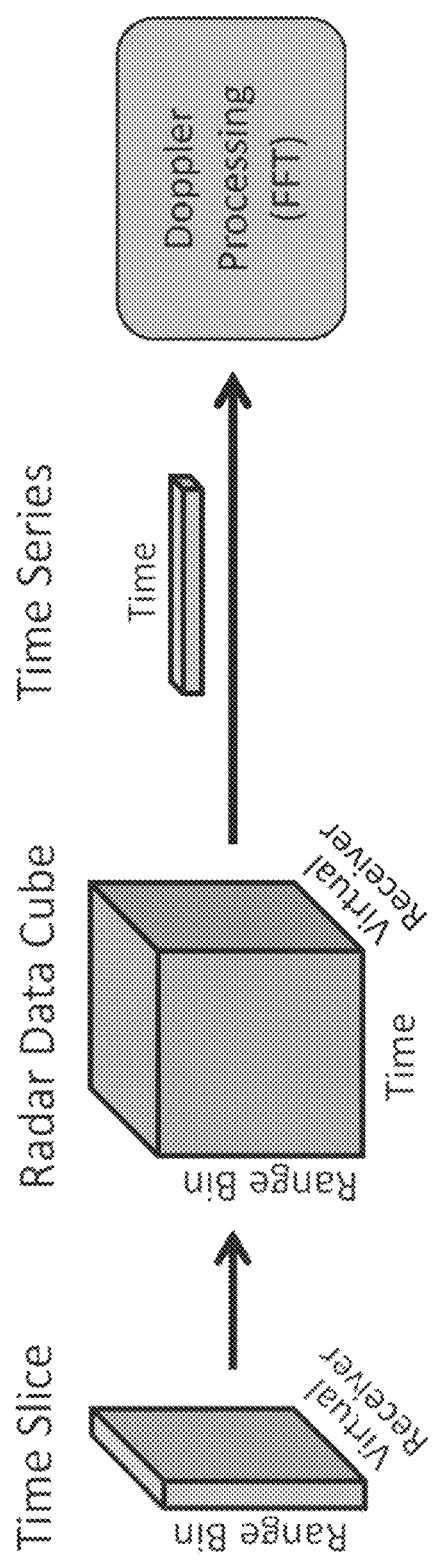
FIG. 3 is an block diagram illustrating a flow of information through a radar receiver of the radar system of FIG. 2.
Figure 7:
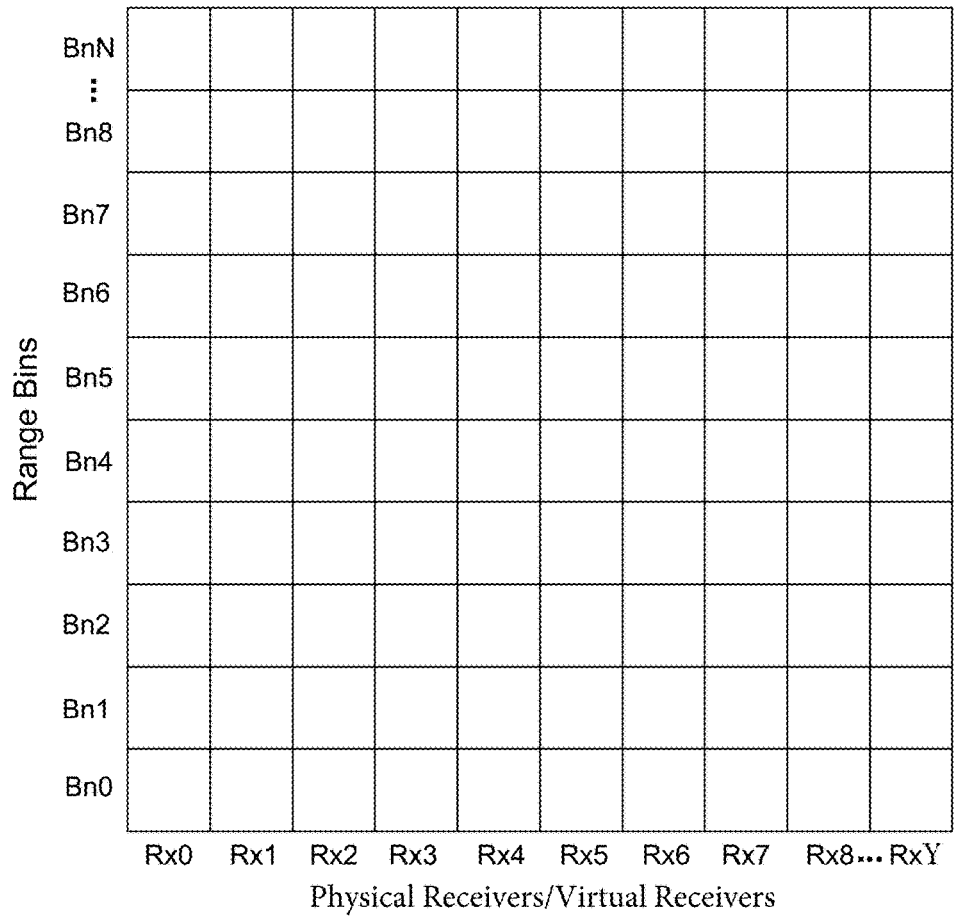
FIG. 7 is a two-dimensional array illustrating the time slice of FIG. 3 in accordance with the present invention.

As illustrated in FIG. 3, the radar system 100 will accumulate multiple Time Slices into a radar data cube. Each time slice comprises a two-dimensional array of complex valued samples taken at regular short time intervals, called "pulses" (typically 2-30 microseconds in duration). In a typical Multiple-Input-Multiple-Output (MIMO) radar, samples are produced by multiple virtual receivers. Alternatively, in a non-MIMO radar, samples are produced by multiple physical receivers. Each virtual (or physical) receiver produces samples for a discretized set of target distances from the radar. Each such distance is called a range bin. Thus, the two dimensions of the time slice array correspond to the receiver that produced the sample, and the range bin whose reflected radar signal the sample is measuring. An exemplary two-dimensional array is illustrated in FIG. 7, where complex samples may be placed into N range bins across each of Y receivers (e.g., 100 range bins across each of 8 receivers).

As illustrated in FIG. 3, a time slice comprises a sample for each range bin of the plurality of range bins for each virtual receiver. The number of virtual receivers may be based upon the number of physical receivers and physical transmitters in the radar system. In an aspect of the present invention, an exemplary time slice may comprise 100 or more range bins, with each of the range bins covering a linear portion of the total range covered, e.g., each range bin may cover a distance of up to one meter or more. In an aspect of the present invention, exemplary range bins may also cover variable sized portions of the total range covered. For example, range bins 1-10 may cover 1 meter each, while bins 11-20 may cover 2 meters each. This may be accomplished by combining 2 or more range bins into one.

Over a longer time interval, called a "scan" (typically 2-30 milliseconds), multiple time slices are accumulated to form a radar data cube. For each receiver and range bin, each Time Slice contains one sample in a time series of samples upon which subsequent Doppler processing is performed. Doppler processing typically comprises a windowing operation followed by a Fast Fourier Transform. Obtaining increased Doppler resolution requires accumulating more samples to create a longer time series to be used in Doppler processing.

Unfortunately, several constraints limit the number of time slices that can be accumulated into a single scan. Traditionally, Doppler processing cannot begin until all time slices have been accumulated, which requires the time slices to be stored in memory. The greater the number of time slices in a scan (i.e., the longer the scan), the more memory is required. Additionally, updated radar output can only be provided once per scan: the longer the scan, the longer the latency between successive outputs. Increased latency can be problematic for algorithms relying on up-to-date outputs from the radar. Finally, during longer scans, targets can move across multiple range bins, making it more difficult to detect and accurately determine the position of targets. In an aspect of the present invention, an exemplary radar data cube may comprise anywhere from 100 time slices to 1,000 time slices, or more. However, the quantity of time slices is limited by the memory and processing capacity of the radar system.

As the aforementioned constraints may prevent achieving high Doppler resolution with a single scan, the present invention provides two methods for achieving high Doppler resolution (i.e., micro-Doppler) using multiple scans. The first method, referred to as the "save-and-process" method, performs the full Doppler processing after saving off radar data from multiple scans. The second method, referred to as the "process-and-integrate" method, performs partial Doppler processing on each scan and integrates the results over multiple scans.

Figure 4:
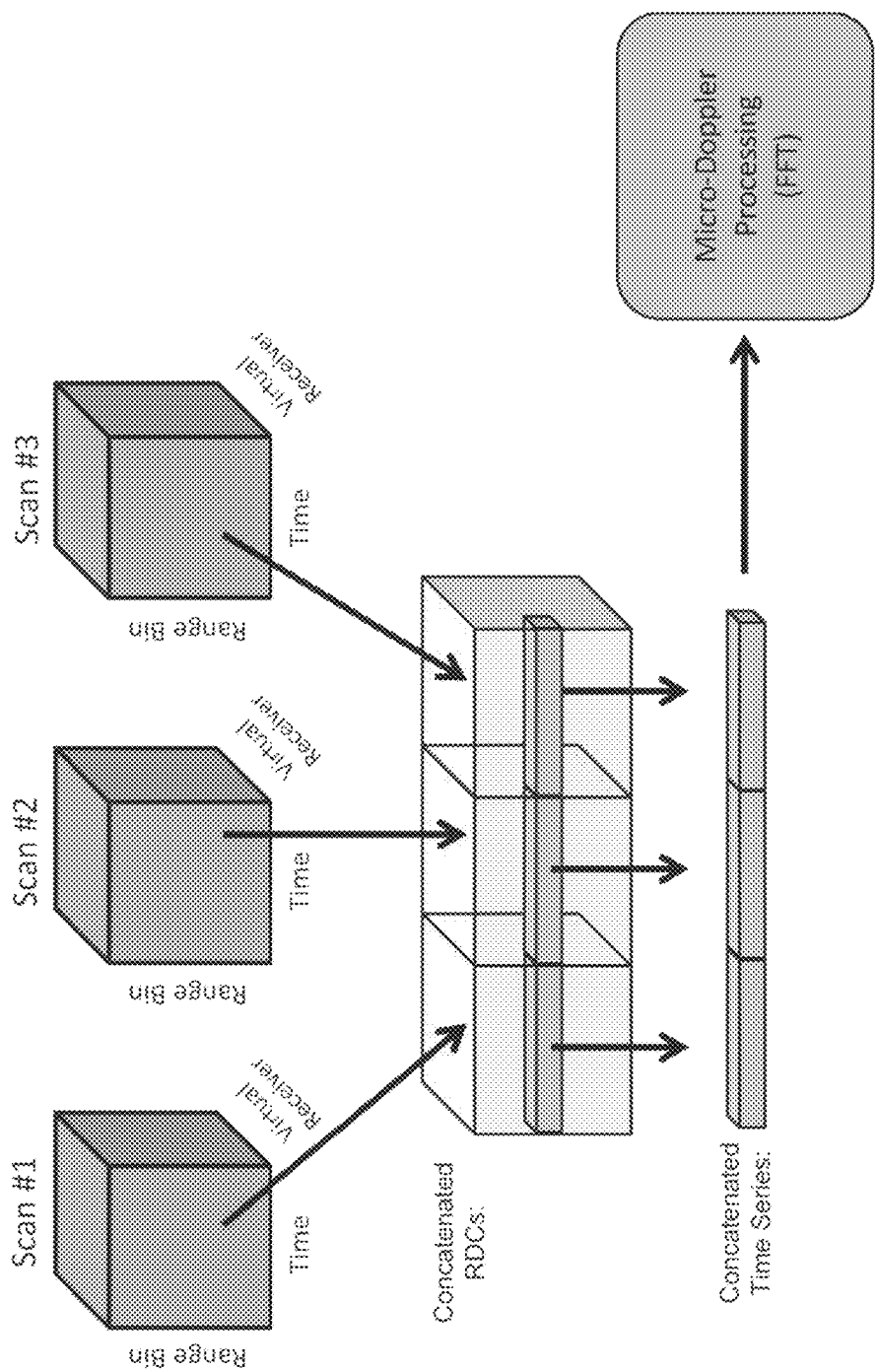
FIG. 4 is a block diagram illustrating a flow of information from multiple radar cubes which may be combined to form a longer time sequence, and from which a more accurate Doppler may be determined in accordance with the present invention.

In the save-and-process method, if it is possible or feasible to use additional memory and processing, the entire radar data cube ('RDC') from multiple scans can be saved in memory. After each scan, the most recent several scans can be concatenated or linked, as illustrated in FIG. 4, to form one large RDC, from which a set of concatenated time series of samples can be extracted for subsequent Doppler processing.

Optionally, rather than continuously saving the entire radar data cube from multiple scans, which would require a large amount of memory, individual scans are performed, saved, analyzed, and discarded. As a result of this analysis, one or more range bins of interest may be identified based on some application specific criteria. For example, in an automotive radar application, if a slow moving target is detected near the predicted path of the host vehicle, additional resolution (micro-Doppler) would be very useful in determining whether the target is a vulnerable road user (e.g., pedestrian or cyclist), another vehicle, or just clutter (e.g., tree branches moving in the wind).

If, based on the analysis, one or more range bins of interest (range slice(s)) are identified, then, as illustrated in FIG. 5, several scans are performed back-to-back, and the range slices of interest are extracted and saved in memory. As illustrated in FIG. 5, for a selected range slice of interest, all of the samples for all of the virtual receivers are processed. While a subset of the samples from just a portion of the virtual receivers may be saved in memory instead, the resolution possible would suffer, resulting in poorer results with regards to Doppler resolution (velocity measurement) and angle resolution (angular position of the object/target with respect to the radar system).

In an embodiment of the present invention, the Doppler processing may be performed on a time series that is synthesized from the time series data of two or more range bins. Interpolation or some other algorithm may be used to combine the time series from multiple time bins. For example, if the target is moving across range bins (over time), the algorithm could initially use the time series from the range bin that initially contains the target. Then, as the target moves to another range bin, the algorithm could interpolate (weighted interpolation) between the initial range bin and the second range bin (the one that the target is moving into), and so on, across multiple range bins.

Figure 5A:
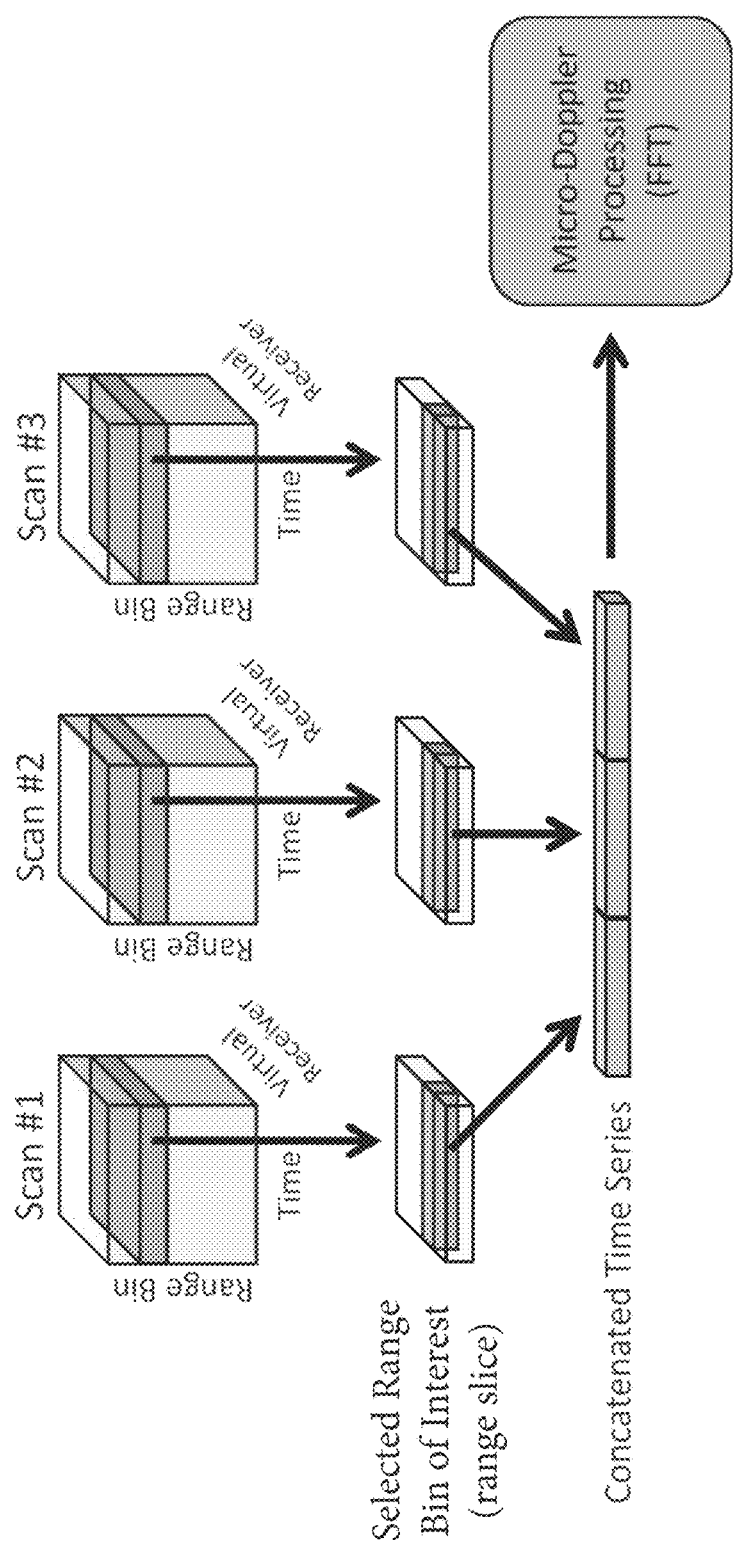
FIG. 5A is a block diagram illustrating a flow of information from multiple radar cubes which may be combined to form a longer time sequence, and from which a more accurate Doppler may be determined in accordance with the present invention.

As illustrated in FIG. 5A, each range slice comprises a set of a time series of samples, one from each virtual receiver. The corresponding time series of samples from each scan are then concatenated (i.e., for each range slice of interest and each virtual receiver). Fourier analysis (an FFT or Fast Fourier Transform, a DFT or Discrete Fourier Transform, a channelizer, or other type of frequency analysis algorithm) is then applied to each concatenated time series of samples to identify, with high resolution, the set of Doppler frequencies present in the time series.

In case of a reduced frequency band of interest, a commensurate reduction of storage and compute is possible without loss of frequency resolution. In this optimized variant of the Save-and-Process method, the time samples of the radar data cube are first filtered to be band-limited within the desired band of frequencies and then decimated to a commensurately lower rate before storage. Subsequent Fourier analysis on this reduced data set provides equivalent results to Fourier analysis on the original radar data cube within the frequency band of interest.

Figure 5B:
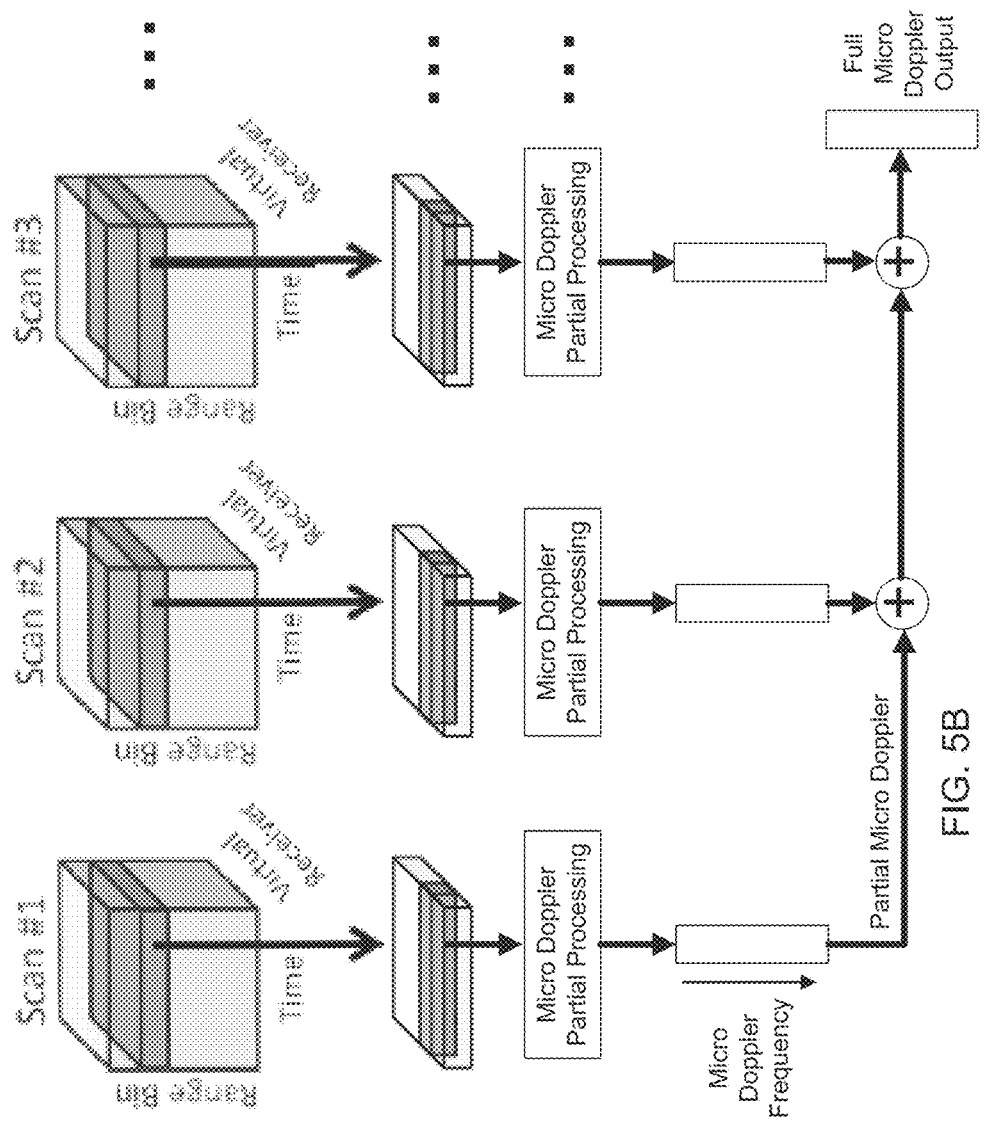
FIG. 5B is a block diagram illustrating a flow of information from multiple radar cubes where time sequences from the multiple radar cubes are individually Doppler processed to produce partial Doppler outputs that are accumulated in accordance with the present invention.

In the process-and-integrate method, illustrated in FIG. 5B, for each of the desired Doppler frequencies, the time series corresponding to each scan (e.g., scan #1, scan #2, and scan #3) is partially processed to produce a partial Doppler output, and then the scan itself is discarded. The first scan's partial Doppler output is saved off into a buffer and for subsequent scans (e.g., scan #2 and scan #3) the partial Doppler is numerically accumulated into this buffer. For each desired Doppler frequency, for a given scan, partial Doppler output is achieved by performing only the portion of the Fourier analysis of time series corresponding to each scan. This restricts the implementation to a DFT, which is more computationally expensive than an FFT, but assuming the number of desired Doppler frequencies is typically small, this would be a desirable tradeoff versus storing the time series data across all scans.

For either the save-and-process method or the process-and-integrate method, the delay between scans, or more precisely between the last sample (that is, time slice) of one scan and the first sample (time slice) of the next scan should most preferably be equal to one pulse time (the time between time slices). Alternatively, the delay should preferably be equal to an integer number of pulse times. If the delay is not equal to an integer number of pulses, the time series is oversampled by a factor to create a new time series that has a delay of integer number of oversampled pulses. For the cases of non-zero delay between scans, a corresponding number of zero samples are inserted into the concatenated time series between the samples from each scan to form a uniformly sampled time series. The inserted samples may have zero value, or may have a value that is interpolated.

The PMCW radar system provides fully digital modulation, with features becoming all digital vs analog. The RF is simpler and smaller, with about a 10× advantage in size over FMCW systems. The radar system provides more area for digital processing, and provides improved range resolution, enhanced range isolation—very small targets next to large targets, enhanced interference mitigation architecture (it can handle an order of magnitude more interferers than FMCW), and enhanced isolation from interfering radars. The radar system provides true MIMO processing, which enables unmatched angular and super resolution. The PMCW radar system is also naturally resistant to jamming. The above described PMCW radar system when comprising multiple transmitters and multiple receivers in a multiple-input-multiple-output (MIMO) system is useful in a radar system where the receivers and transmitters need to receive and transmit simultaneously.

Figure 8:
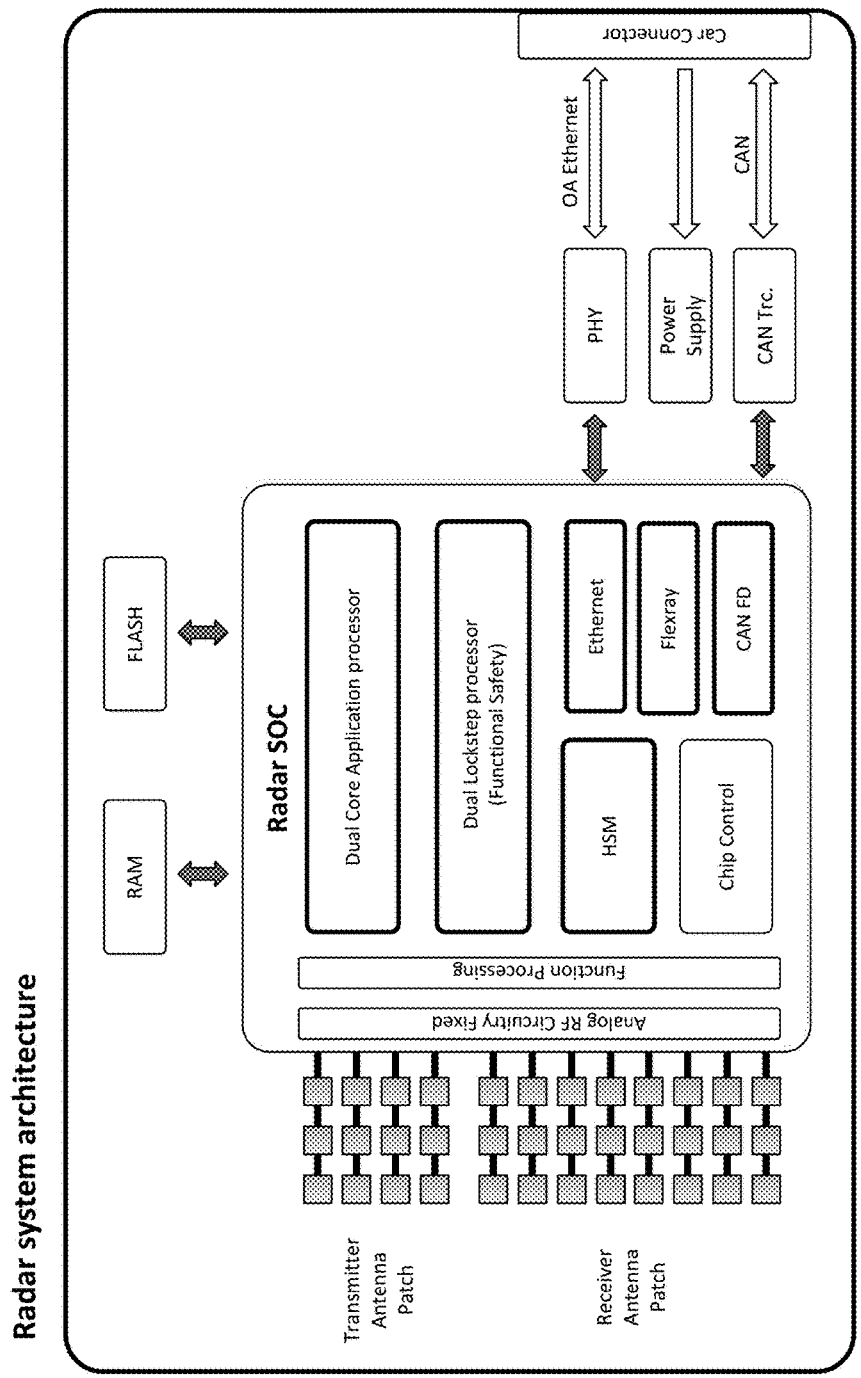
FIG. 8 is a block diagram illustrating another radar system with a plurality of receivers and a plurality of transmitters in accordance with the present invention.
Figure 9:
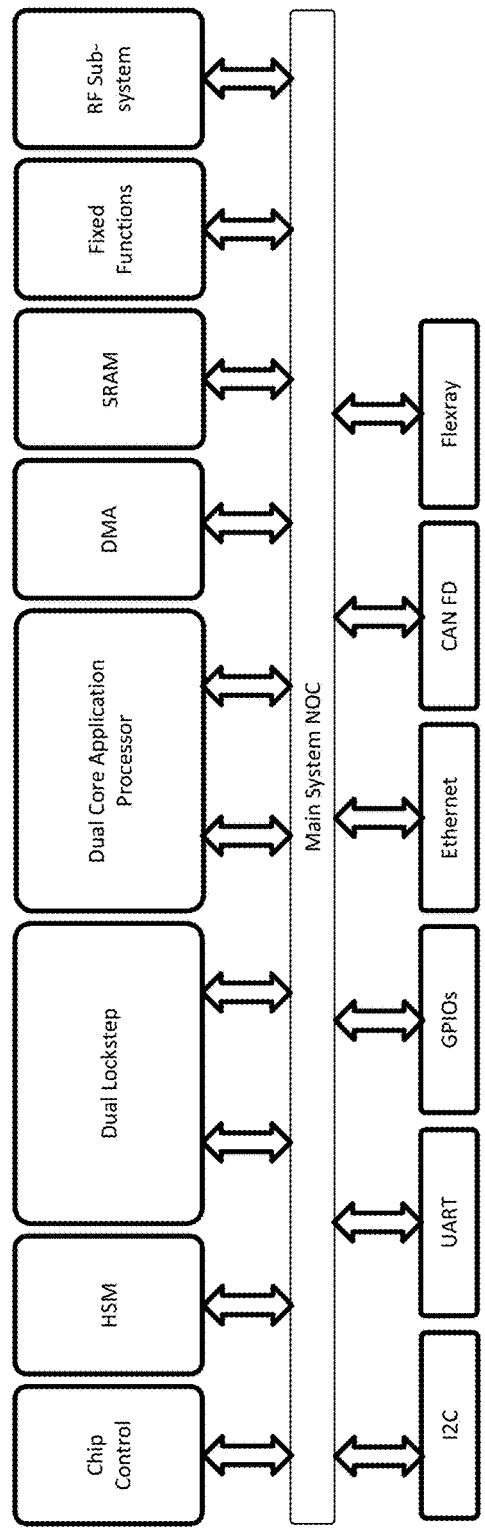
FIG. 9 is a block diagram of an exemplary system on a chip architecture for the radar system of the present invention.

FIG. 8 illustrates another exemplary radar system of the present invention. Similar to the radar system 600 of FIG. 6, the radar system of FIG. 8 comprises a plurality of transmitter and receiver antennas. The radar system of FIG. 8 also includes RAM and flash memories, as well as interconnections to the automobile. FIG. 9 illustrates an exemplary system on chip architecture for the radar system of FIG. 8.

Figure 14:
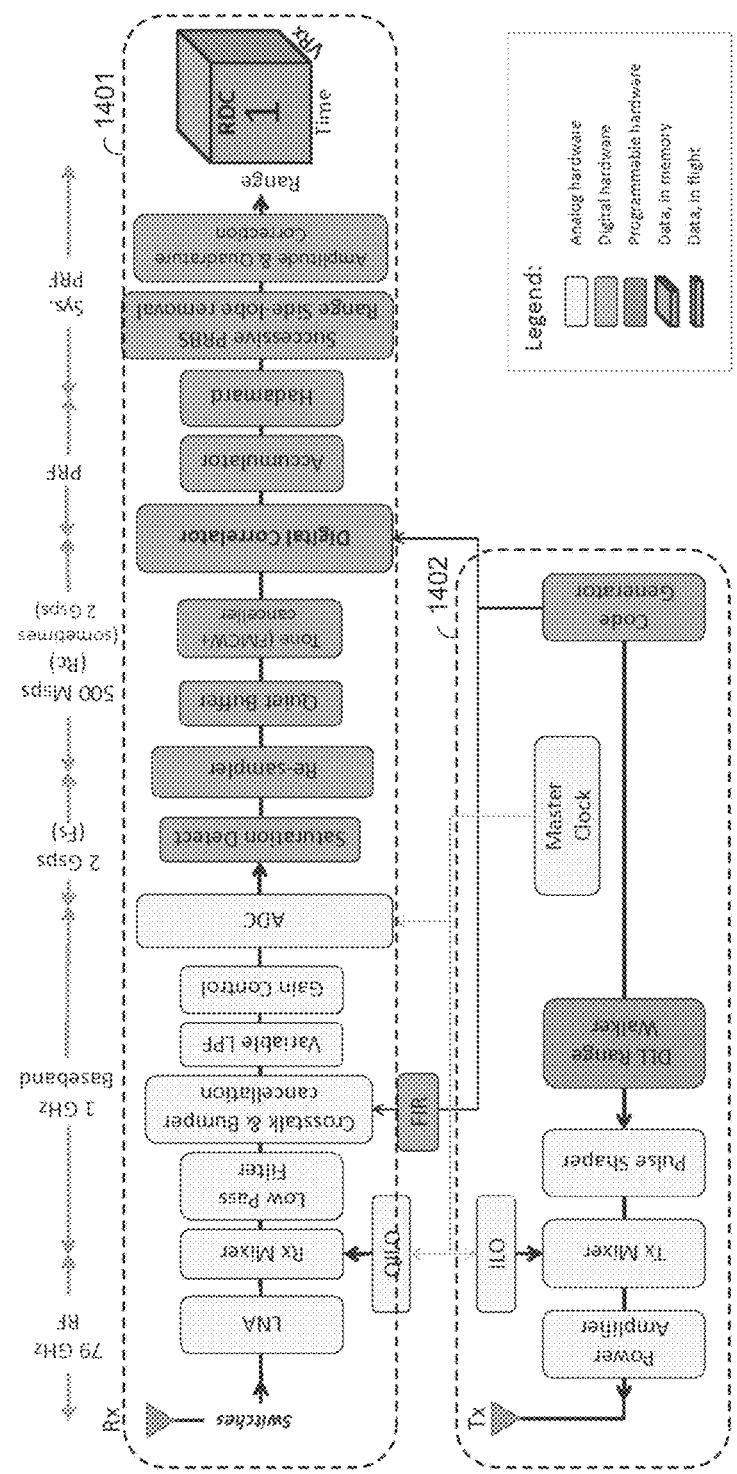
FIG. 14 is a block diagram of an exemplary receive pipeline and transmit pipeline for the radar system of the present invention.

FIG. 14 illustrates an exemplary receive pipeline 1401 and an exemplary transmit pipeline 1402 for a radar system of the present invention. As illustrated in FIG. 14, a code generator outputs a code that is used to form a baseband signal that is upconverted to an RF signal by an RF upconverter followed by a transmission antenna. As illustrated in FIG. 14, the received signal at a receiver antenna is down converted by the receive pipeline 1401's amplifiers, filters, and mixers and converted into a complex baseband signal. The resulting signal after downconversion is sampled by an analog-to-digital converter (ADC) and correlated by a correlator of the receive pipeline 1401 with different delays (time shifts) of replicas of the transmitted sequence to produce a complex correlation value for each period of the binary sequence. A particular correlator that has a replica that is matched in delay to the time delay of the reflected signal from an object would produce a large magnitude complex correlator output. A single correlator will produce a sequence of correlator outputs that will be large if the reflected signal has a delay that matches the delay of the replica of the baseband transmitted signal. If there is a different velocity of the radar system and the object causing the reflection, there will be a Doppler shift in the frequency of the reflected signal relative to the transmitted signal. A sequence of correlator outputs for one particular delay will have complex values that rotate at a rate related to the Doppler shift. Using a sequence of correlator outputs (also referred to as a scan), the Doppler shift may be estimated and thus the velocity of the object in the environment. The longer the sequence of correlator outputs used to estimate the Doppler frequency, the greater the accuracy and resolution of the estimation of the Doppler frequency, and thus the velocity of the object.

There may be scans for different correlators that use replicas of the transmitted signal with different delays. Because there are multiple transmitters and multiple receivers, there may be correlators that process a received signal at each receiver that are matched to a particular transmitted signal by a particular transmitter. The receive pipeline of 1401 the radar system will thus generate a sequence of correlator outputs for each possible delay and for each virtual receiver. This set of data is called a radar data cube (RDC) made up of individual time slices.

In accordance with an aspect of the present invention, the receive pipeline 1401 comprises a correlator block, where the correlator block comprises a bank of correlators with a correlator for every range bin and every virtual receiver combination. In other words, a two-dimensional bank of correlators similar to the two-dimensional array of range bins illustrated in FIG. 7. Optionally, the bank of correlators may be smaller than the array of range bins. For example, there may be one correlator for each physical receiver, such that each correlator outputs an output for each virtual receiver of the corresponding physical receiver. Optionally, the entire receive pipeline 1401 after the receiver antenna(s) may be implemented on a single integrated chip. Optionally, even the antenna may be implemented on the same single integrated chip as the rest of the receive pipeline 1401. In accordance with another aspect of the present invention, the correlator functionality may be implemented in a receive pipeline. Optionally, the correlator functionality may be implemented in a processor. Optionally, portions of the receive pipeline may be implemented in a processor.

In accordance with an aspect of the present invention, the radar system may utilize 28 nm bulk CMOS 79 GHz automotive radar. The system provides a complete Radar-on-a-Chip (ROC) and provides support for multiple chips. The system provides Long Baseline Interferometry (LBI), and has a substantially larger aperture (better angular accuracy) and a better estimate of centroid.

The system of the present invention provides enhanced accuracy and may provide the highest accuracy and resolution over all standalone radars. The large MIMO array and LBI capability provides higher angular accuracy and resolution, such as for detection of vulnerable road users (VRU)—detecting pedestrians and cyclists at greater range enables earlier warning, while longer range detection at high azimuth angles enables a longer tracking period for a lower probability of false alarms. The high sampling frequency and range walking of the system of the present invention provides enhanced range resolution and accuracy, such as for parking assistance, BLIS, LCA—all the way down to mm range in resolution and accuracy. For detection of VRU, the system provides high range resolution for selected targets at large distances. The hardware Doppler processing engine of the system of the present invention provides enhanced or unmatched radial velocity resolution. For detection of VRU, the system provides micro-Doppler detection and classification of pedestrians (moving arms/legs) and bicycles (moving legs, wheels).

The software defined radar system of the present invention thus provides full digital control of scan parameters, which allows the radar to adapt to changing scenarios. The system maintains the highest resolution/accuracy tracking for high priority targets while continuously scanning for new detections. For long range detection and tracking (4 high-power transmitters per connected radar), such as for forward collision warning (FCW) or autonomous emergency braking (AEB), the maximum range is limited only by RCS—car detection at over 500 m—which enables longer tracking time. The system provides enhanced signal processing power, and is integrated into a single chip, and provides super-resolution angle-of-arrival processing for separating objects and micro-Doppler tracking, such as for VRU—cyclists and pedestrians. The system of the present invention also provides low level fusion, and can operate in a high target density urban environment—with a simultaneous tracking of up to at least 2500 objects. The system has access to a complete digital pipeline that can be used to refine the region of interest (ROI) being scanned/processed.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A radar sensing system for a vehicle, the radar sensing system comprising:

a transmit pipeline comprising a plurality of transmitters configured for installation and use on a vehicle, and configured to transmit radio signals;

a receive pipeline comprising a plurality of receivers configured for installation and use on the vehicle, and configured to receive radio signals, wherein the received radio signals include reflected radio signals that are the transmitted radio signals reflected from an object; and a processor;

wherein the receive pipeline is configured to correlate received radio signals of the plurality of receivers with a plurality of time-delayed replicas of the transmitted radio signals to produce samples;

wherein each time-delayed replica of the plurality of time-delayed replicas of the transmitted radio signals corresponds with a particular range bin of a particular receiver of the plurality of receivers;

wherein samples are produced during a first plurality of time slices of a first scan;

wherein a time slice of the first plurality of time slices comprises a two-dimensional array of samples, the two-dimensional array defined by the plurality of receivers and a respective plurality of range bins for each receiver of the plurality of receivers;

wherein each range bin of each respective plurality of range bins contains a sample from the respective receiver of the plurality of receivers;

wherein the first plurality of time slices is accumulated into a first three-dimensional array during the first scan;

wherein the receive pipeline is further configured to produce samples during a second plurality of time slices of a second scan;

wherein the second plurality of time slices is accumulated into a second three-dimensional array during the second scan;

wherein the receive pipeline is further configured to output the first and second three-dimensional arrays to the processor;

wherein the processor is configured to (a) selectively process a portion of the first three-dimensional array, (b) produce a first partial Doppler output, (c) discard the first three-dimensional array, and (d) save the first partial Doppler output into memory;

wherein the portion of the first three-dimensional array comprises less than the entire first three-dimensional array;

wherein the portion of the first three-dimensional array comprises a first time series of samples for at least one range bin of each receiver of the plurality of receivers;

wherein the processor is further configured to selectively process a second time series of samples from a second three-dimensional array to produce a second partial Doppler output; and wherein the processor stores the second partial Doppler output into the memory by numerically accumulating the second partial Doppler output with the first partial Doppler output.

2. The radar sensing system of claim 1, wherein a radar unit comprising the plurality of transmitters and plurality of receivers is configured to be installed at at least one of a front portion of the vehicle, a side portion of the vehicle, a rear portion of the vehicle, and behind a windshield of the vehicle.

3. The radar sensing system of claim 1, wherein the transmitted radio signals and the received radio signals are respectively transmitted and received simultaneously.

4. The radar sensing system of claim 3, wherein the processor is further configured to post process the accumulated partial Doppler outputs to establish an angle of arrival for the object.

5. The radar sensing system of claim 1, wherein the processor comprises a CMOS-based processor, and wherein the processor, receivers, and transmitters are established within a radar system architecture that is established on a single semiconductor substrate.

6. The radar sensing system of claim 1, wherein a time-delayed replica of the transmitted radio signals that is highly correlating with a delay of the received signal produces a complex value with a larger amplitude as compared to an amplitude of non-correlating signals.

7. The radar sensing system of claim 1, wherein the Doppler processing is performed on a time series synthesized from the time series data from two or more range bins.

8. The radar sensing system of claim 1, wherein the radio signals comprise phase modulated continuous wave radio frequency (RF) signals.

9. The radar sensing system of claim 1, wherein the numerically accumulated first partial Doppler output and second partial Doppler output provides a higher Doppler resolution than the first time series of samples, and wherein the high Doppler resolution is achieved during the second scan, and wherein the second scan is substantially equal in time duration to the first scan.

10. The radar sensing system of claim 1, wherein the samples comprise complex-valued digitized samples.

11. A method for achieving high resolution Doppler measurements for a vehicle radar sensing system, the method comprising:

providing a radar sensing system comprising (i) a transmit pipeline configured for installation and use on a vehicle, wherein the transmit pipeline comprises a plurality of transmitters configured to transmit radio signals, (ii) a receive pipeline configured for installation and use on the vehicle, wherein the receive pipeline comprises a plurality of receivers configured to receive radio signals that include the transmitted radio signals reflected from objects in the environment, and (iii) a processor for processing the radio signals received by the plurality of receivers;

sampling the received radio signals during a first plurality of time slices of a first scan, wherein each time slice comprises a plurality of samples, a respective sample for each range bin of each plurality of range bins for each receiver of the plurality of receivers in each time slice, and wherein the samples are produced by correlating the received signals to time-delayed replicas of the transmitted signals;

accumulating the first plurality of time slices into a first radar data cube during the first scan;

sampling the received radio signals during a second plurality of time slices of a second scan;

accumulating the second plurality of time slices into a second radar data cube during the second scan;

outputting the first and second radar data cubes to the processor;

with the processor, selectively Doppler processing a portion of the first radar data cube, producing a first partial Doppler output, discarding the first radar data cube, and saving the first partial Doppler output into a memory;

wherein the portion of the first radar data cube comprises a first time series of samples for at least one range bin of each receiver of the plurality of receivers;

with the processor, selectively Doppler processing a second time series of samples from the second radar data cube to produce a second partial Doppler output; and with the processor, storing the second partial Doppler output into the memory by numerically accumulating the second partial Doppler output with the first partial Doppler output.

12. The method of claim 11, wherein the portion of the first radar data cube comprises less than the entire first radar data cube.

13. The method of claim 11, wherein the transmitted radio signals and the received radio signals are respectively transmitted and received simultaneously.

14. The method of claim 11 further comprising post-processing the accumulated partial Doppler outputs to establish an angle of arrival for each object.

15. The method of claim 11, wherein the Doppler processing is performed on a time series synthesized from the time series data from two or more range bins.

16. The method of claim 11, wherein the numerically accumulated first partial Doppler output and second partial Doppler output provides a higher Doppler resolution than the first time series of samples, and wherein the high Doppler resolution is achieved during the second scan, and wherein the second scan is substantially equal in time duration to the first scan.

17. The method of claim 11, wherein the samples comprise complex-valued digitized samples.

18. The method of claim 11, wherein the transmitted radio signals comprise phase modulated continuous wave radio signals.

19. The method of claim 11, wherein a time-delayed replica of the transmitted radio signals that is highly correlating with a delay of the received signal produces a complex value with a larger amplitude as compared to an amplitude of non-correlating signals.

20. The method of claim 11, wherein the processor comprises a CMOS-based processor, and wherein the processor, receivers, and transmitters are established within a radar system architecture that is established on a single semiconductor substrate.

21. A radar sensing system for a vehicle, the radar sensing system comprising:
- a transmit pipeline configured for installation and use on a vehicle, wherein the transmit pipeline comprises a plurality of transmitters configured to transmit radio signals;
- a receive pipeline configured for installation and use on the vehicle, wherein the receive pipeline comprises a plurality of receivers configured to receive radio signals that include the transmitted radio signals reflected from objects in the environment; and
- a processor;
- wherein the receive pipeline is configured to correlate received radio signals of the plurality of receivers with a plurality of time-delayed replicas of the transmitted radio signals to produce samples;
- wherein each time-delayed replica of the plurality of time-delayed replicas of the transmitted radio signals corresponds with a particular range bin of a particular receiver of the plurality of receivers;
- wherein samples are produced during at least two or more scans, each scan comprising a respective plurality of time slices;
- wherein each time slice of the respective plurality of time slices comprises a two-dimensional array of samples, the two-dimensional array defined by the plurality of receivers and a respective plurality of range bins for each receiver of the plurality of receivers;
- wherein each range bin of each respective plurality of range bins contains a sample from the respective receiver of the plurality of receivers;
- wherein each plurality of time slices is accumulated into a corresponding radar data cube of the two or more radar data cubes during a respective scan of the at least two or more scans;
- wherein the receive pipeline is configured to output each of the two or more radar data cubes to the processor;
- wherein the processor is configured to (i) selectively process a portion of each of the two or more radar data cubes to produce a respective partial Doppler output for each of the two or more radar data cubes, and (ii) discard the two or more radar data cubes;
- wherein a portion of a radar data cube comprises a time series of samples for at least one range bin of each receiver of the plurality of receivers; and
- wherein the processor is configured to store in memory a full Doppler output by successively numerically accumulating together each of the partial Doppler outputs to form the full Doppler output.

22. The radar sensing system of claim 21, wherein a radar unit comprising the plurality of transmitters and plurality of receivers is configured to be installed at at least one of a front portion of the vehicle, a side portion of the vehicle, a rear portion of the vehicle, and behind a windshield of the vehicle.

23. The radar sensing system of claim 21, wherein the transmitted radio signals and the received radio signals are respectively transmitted and received simultaneously.

24. The radar sensing system of claim 21, wherein the processor is further configured to post process the accumulated partial Doppler outputs to establish an angle of arrival for each object.

25. The radar sensing system of claim 21, wherein the processor comprises a CMOS-based processor, and wherein the processor, receivers, and transmitters are established within a radar system architecture that is established on a single semiconductor substrate.

26. The radar sensing system of claim 21, wherein a time-delayed replica of the transmitted radio signals that is highly correlating with a delay of the received signal produces a complex value with a larger amplitude as compared to an amplitude of non-correlating signals.

27. The radar sensing system of claim 21, wherein the Doppler processing is performed on a time series synthesized from the time series data from two or more range bins.

28. The radar sensing system of claim 21, wherein the radio signals comprise phase modulated continuous wave radio frequency (RF) signals.

29. The radar sensing system of claim 21, wherein a numerically accumulated first partial Doppler output of a first scan and a second partial Doppler output of a second scan provides a higher Doppler resolution than a first time series of samples, and wherein a high Doppler resolution is achieved during the second scan, wherein the second scan is substantially equal in time duration to the first scan, and wherein the first partial Doppler output and the second partial Doppler output are numerically accumulated during the second scan.

30. The radar sensing system of claim 21, wherein the samples comprise complex-valued digitized samples.

* * * * *